(12) United States Patent
Han

(10) Patent No.: US 12,254,580 B2
(45) Date of Patent: Mar. 18, 2025

(54) IDENTITY INFORMATION PRESENTATION METHOD AND APPARATUS, TERMINAL, SERVER, AND STORAGE MEDIUM

(71) Applicant: TENCENT TECHNOLOGY (SHENZHEN) COMPANY LIMITED, Guangdong (CN)

(72) Inventor: Rui Han, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 237 days.

(21) Appl. No.: 18/048,562

(22) Filed: Oct. 21, 2022

(65) Prior Publication Data
US 2023/0066708 A1    Mar. 2, 2023

Related U.S. Application Data

(63) Continuation of application No. PCT/CN2022/073258, filed on Jan. 21, 2022.

(30) Foreign Application Priority Data

Jan. 28, 2021    (CN) .................. 202110120989.X

(51) Int. Cl.
    *G06T 19/00*    (2011.01)
    *G06T 19/20*    (2011.01)
(52) U.S. Cl.
    CPC ............ *G06T 19/006* (2013.01); *G06T 19/20* (2013.01); *G06T 2219/024* (2013.01); *G06T 2219/2004* (2013.01); *G06T 2219/2016* (2013.01)

(58) Field of Classification Search
    None
    See application file for complete search history.

(56) References Cited

U.S. PATENT DOCUMENTS

2018/0165848 A1    6/2018    Johansen

FOREIGN PATENT DOCUMENTS

CN    111045510 A    4/2020
CN    111428549 A    7/2020

OTHER PUBLICATIONS

International Search Report for PCT/CN2022/073258 dated Mar. 30, 2022.

*Primary Examiner* — Robert J Craddock
(74) *Attorney, Agent, or Firm* — Sughrue Mion, PLLC

(57) ABSTRACT

An identity information presentation method and apparatus, a terminal, a server, and a storage medium are provided, which relate to the field of augmented reality technologies. The method includes: acquiring an image by using the camera, the acquired image including a character; displaying the image acquired by the camera based on an augmented reality social mode, in which augmented reality social information is provided for a currently logged-in account; and presenting, based on a geographical location of the character, first identity information around the character in an augmented reality manner, the first identity information indicating a social identity of the character.

16 Claims, 10 Drawing Sheets

IDENTITY INFORMATION PRESENTATION METHOD AND APPARATUS, TERMINAL, SERVER, AND STORAGE MEDIUM

RELATED APPLICATION

This application is a continuation application of International Application No. PCT/CN2022/073258, filed Jan. 21, 2022, which claims priority to Chinese Patent Application No. 202110120989.X, filed on Jan. 28, 2021, the disclosures of which are herein incorporated by reference in their entireties.

FIELD

Embodiments of the disclosure relate to the field of augmented reality technologies, and in particular, to an identity information presentation method and apparatus, a terminal, a server, and a storage medium.

BACKGROUND

Offline interaction is an interaction mode performed by multiple people in a specific physical space. Common offline interaction scenarios include an industry summit, a return banquet, a friend-making meeting, and the like.

When attending offline interaction, participants may not know about each other, and communication is often needed to know an identity of another participant. In order to improve the interaction efficiency between the participants during the offline interaction, in related technologies, a host of offline interaction may collect and sort identity information (a photo is required) of the participants in advance, and send the sorted identity information to each participant; and during offline interaction, each participant may determine the identity of another participant through face comparison with the sorted identity information.

However, when there are a large number of participants in an offline interaction scenario, it takes a lot of time to perform face comparison manually, and an error of a face comparison result is relatively large, resulting in low efficiency and poor accuracy of offline interaction.

SUMMARY

The embodiments of the disclosure provide an identity information presentation method and apparatus, a terminal, a server, and a storage medium, which may improve the efficiency and accuracy of offline interaction. The technical solutions are as follows:

According to an aspect, an example embodiment of the disclosure provides an identity information presentation method, performed by a terminal, the method including:

acquiring an image by using the camera, the acquired image including a character;

displaying the image acquired by the camera based on an augmented reality social mode, in which augmented reality social information is provided for a currently logged-in account; and presenting, based on a geographical location of the character, first identity information around the character in an augmented reality manner, the first identity information indicating a social identity of the character.

According to another aspect, an example embodiment of the disclosure provides an identity information presentation method, the method including:

receiving an identity information obtaining request from a second terminal, the identity information obtaining request including first geographical location information representing a geographical location of a character, which is captured by a camera of the second terminal, the first geographical location information being based on an image of the character captured by the camera;

determining first identity information of the character based on the first geographical location information, the first identity information being augmented reality social information corresponding to the character; and transmitting the first identity information to the second terminal, to be presented around the character in an augmented reality manner on the second terminal.

According to another aspect, an example embodiment of the disclosure provides an identity information presentation apparatus, the apparatus including:

at least one memory configured to store program code; and at least one processor configured to read the program code and operate as instructed by the program code, the program code including:

image acquisition code configured to cause the at least one processor to acquire an image by using a camera, an acquired image including a character; and information presentation code configured to cause the at least one processor to display the image acquired by the camera based on an augmented reality social mode, in which augmented reality social information is provided for a currently logged-in account; and present, based on a geographical location of the character, first identity information around the character in an augmented reality manner, the first identity information indicating a social identity of the character.

According to another aspect, an example embodiment of the disclosure provides an identity information presentation apparatus, the apparatus including:

at least one memory configured to store program code; and at least one processor configured to read the program code and operate as instructed by the program code, the program code including:

request receiving code configured to cause the at least one processor to receive an identity information obtaining request transmitted by a second terminal, the identity information obtaining request including first geographical location information, the first geographical location information being determined and obtained by a terminal performing character identification on an image acquired by a camera, and the first geographical location information being used for representing a geographical location of a character in an environment.

information determining code configured to cause the at least one processor to determine first identity information of the character based on the first geographical location information, the first identity information being augmented reality social information corresponding to the character; and information transmitting code configured to cause the at least one processor to transmit the first identity information to the second terminal, the second terminal being configured to present the first identity information around the character in an augmented reality manner.

According to another aspect, an example embodiment of the disclosure provides a terminal, including a processor and a memory, where the memory stores at least one instruction, and the at least one instruction is loaded and executed by the processor to implement the identity information presentation method on a terminal side according to any one of the foregoing aspects.

According to another aspect, an example embodiment of the disclosure provides a server, including a processor and a memory, where the memory stores at least one instruction, and the at least one instruction is loaded and executed by the processor to implement the identity information presentation method on a server side according to any one of the foregoing aspects.

According to another aspect, an example embodiment of the disclosure provides a computer-readable storage medium, the computer-readable storage storing at least one piece of program code, where the at least one piece of program code is loaded and executed by a processor to implement the identity information presentation method on a terminal side according to any one of the foregoing aspects or implement the identity information presentation method on a server side according any one of to the foregoing aspects.

According to another aspect, an example embodiment of the disclosure provides a computer program product or a computer program, the computer program product or the computer program including computer instructions, the computer instructions being stored in a computer-readable storage medium. A processor of a computer device reads the computer instructions from the computer-readable storage medium and executes the computer instructions to cause the computer device to perform the identity information presentation method according to any one of the foregoing aspects.

BRIEF DESCRIPTION OF THE DRAWINGS

The above and/or other aspects will become apparent and more readily appreciated from the following description of example embodiments, taken in conjunction with the accompanying drawings.

DETAILED DESCRIPTION

Figure 1:
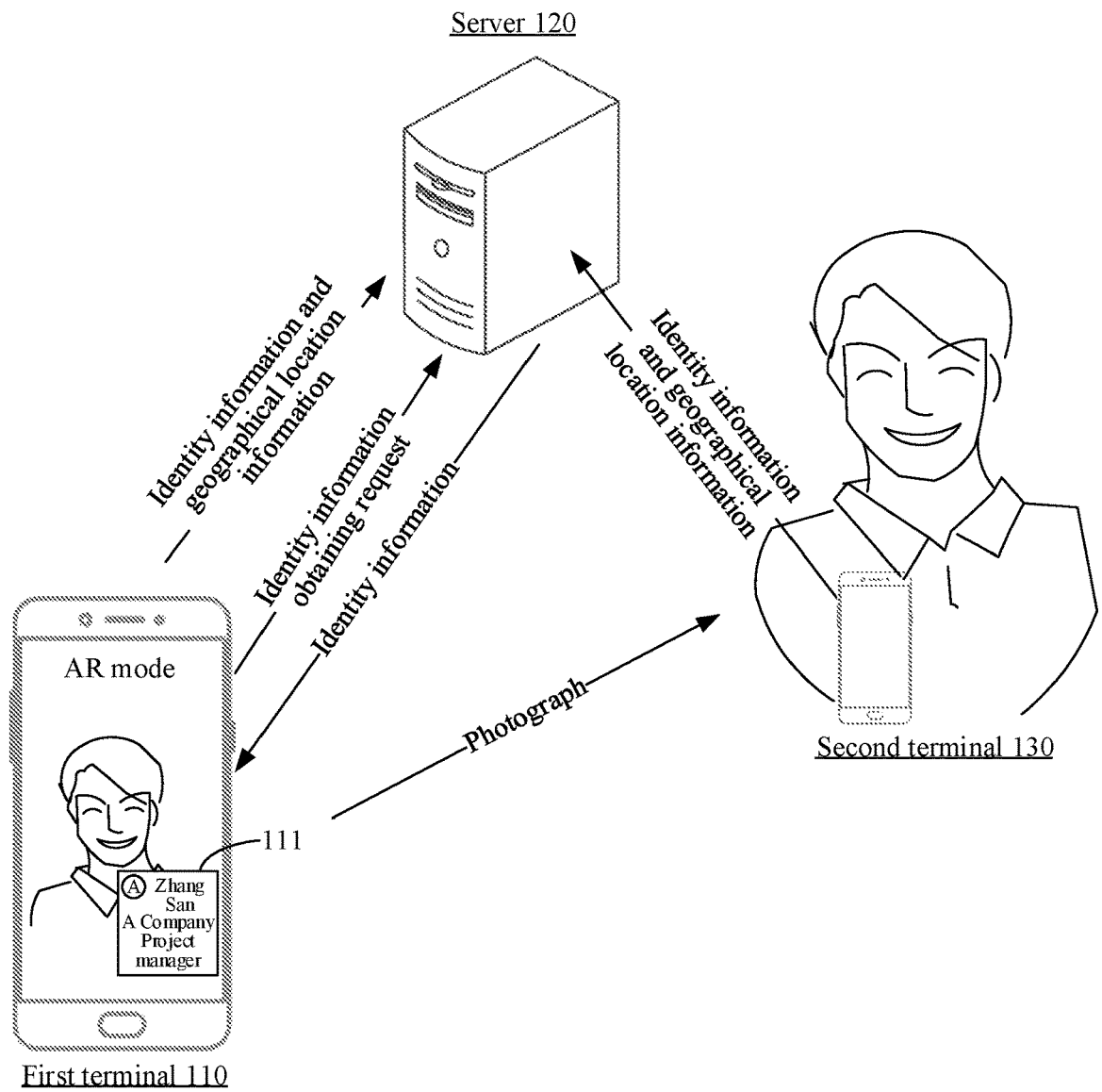
FIG. 1 is a schematic diagram of an implementation environment according to an exemplary embodiment of the disclosure.

Details of example embodiments are included in the following detailed description and drawings. Throughout the drawings and the detailed description, unless otherwise described, the same drawing reference numerals will be understood to refer to the same elements, features, and structures. The relative size and depiction of these elements may be exaggerated for clarity, illustration, and convenience.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements. Also, the terms, such as 'unit' or 'module', etc., should be understood as a unit for performing at least one function or operation and that may be embodied as hardware, software, or a combination thereof.

FIG. 1 is a schematic diagram of an implementation environment according to an exemplary embodiment of the disclosure. The implementation environment includes a first terminal 110, a server 120, and a second terminal 130. Data communication is performed between the first terminal 110 and the server 120 and between the second terminal 130 and the server 120 through a communication network. In an embodiment, the communication network may be a wired network or a wireless network, and the communication network may be at least one of a local area network, a metropolitan area network, and a wide area network.

The first terminal 110 is a terminal used by a first user, the terminal is an electronic device that has an image acquisition function and an augmented reality function, and the electronic device may be a smartphone, a tablet computer, smart glasses, and the like. With the help of the image acquisition function and the augmented reality function, the first terminal 110 may display identity information of a surrounding character (e.g., an object such as a person nearby a user of the first terminal 110) in an augmented reality manner.

For example, when the first terminal 110 is a smartphone, the smartphone may perform image acquisition through a rear-facing camera, then display an acquired image through a screen, and display an augmented reality contact card (including identity information) around a character in the image. When the first terminal 110 is smart glasses, the smart glasses may perform image acquisition through a camera and display an acquired image and an augmented reality contact card through a lens with a display function (a non-transparent lens, which is equivalent to a display screen), or project an image of the augmented reality contact card on a lens (transparent) or human eyeballs through a projection component.

In the embodiments of the disclosure, the first terminal 110 further has a positioning function. Through the positioning function, the first terminal 110 may obtain geographical location information of a geographical location of the first terminal 110 in an environment, and determine geographical location information of the character in the acquired image based on the geographical location information of the first terminal 110, where the geographical location information may be latitude and longitude coordinate information, and the positioning function may be implemented by a positioning component. The positioning component may be a Global Positioning System (GPS) component, a Beidou positioning component, and the like, which is not limited in this embodiment.

The second terminal 130 is a terminal used by a second user, the terminal is an electronic device that has a positioning function, and the electronic device may be a smartphone, a tablet computer, smart glasses, or the like that is set with a positioning component. After obtaining geographical location information of the second terminal 130 through the positioning function, the second terminal 130 may report the geographical location information of the second terminal 130 to the server 120 in real time, so that the server 120 implements an identity information presentation function based on the reported geographical location information.

It may be understood that in example implementations of the disclosure, related data such as positioning information, geographical location information, and image data is involved. When the foregoing embodiments of the disclosure are applicable to a specific product or technology, user permission, authorization, or consent needs to be obtained, and collection, use, and processing of related data need to comply with related laws, regulations, and standards of related countries and regions.

In an embodiment, the second terminal 130 also has an image acquisition function and an augmented reality function, and with the help of the image acquisition function and the augmented reality function, the second terminal 130 may also display identity information of a surrounding character in the augmented reality manner.

The server 120 may be an independent physical server, or may be a server cluster or a distributed system including a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. In an embodiment, the server 120 may also be a node in a block chain system, which is not limited in this embodiment.

In an embodiment, an application program with an identity information presentation function is installed in both the first terminal 110 and the second terminal 130. The server 120 is a backend server of the application program, and the application program may be an instant messaging application program, a social application program, a friend-making application program, a recruitment application program, and the like, which is not limited in this embodiment.

In the embodiments of the disclosure, the server 120 stores identity information reported by each terminal and geographical location information reported by each terminal in real time, and the identity information and the geographical location information corresponding to each terminal are stored in association.

In an offline interaction scenario, as shown in FIG. 1, the first terminal 110 used by a user A reports identity information of the user A and geographical location information of the first terminal 110 to the server 120; and the second terminal 130 used by a user B reports identity information of the user B and geographical location information of the second terminal 130 to the server 120. When the user A intends to obtain the identity information of the user B, the first terminal 110 is used to photograph the user B. The first terminal 110 determines first geographical location information of the user B based on the photographed image and the geographical location information of the first terminal 110, and then transmits an identity information obtaining request that includes the first geographical location information to the server 120. After receiving the request, the server 120 determines that the user B is at a location indicated by the first geographical location information, and then feeds back the identity information of the user B to the first terminal 110. The first terminal 110 generates an augmented reality contact card 111 according to the received identity information, and displays the augmented reality contact card 111 around the user B in the image.

Similarly, when the user B intends to obtain the identity information of the user A, the second terminal 130 may also be used to photograph the user A, and second geographical location information of the user A may be determined, so that the identity information of the user A is obtained from the server 120 based on the second geographical location information and augmented reality presentation is performed.

The foregoing embodiment is illustrated only in a case that the method is applicable to a smartphone. In a case that the method is applicable to smart glasses, the user only needs to wear the smart glasses and gaze at a character whose identity information needs to be obtained to trigger an identity information obtaining and presentation process (e.g., a trigger condition may be that a gaze duration exceeds a duration threshold), and there is no need to manually trigger a photographing function, which is not limited in this embodiment.

The foregoing embodiment only schematically illustrates an identity information presentation process through the first terminal and the second terminal. In an actual application process, the solution provided in the embodiments of the disclosure may be applicable to an offline interaction scenario with three or more users (e.g., three or more terminals are included), which is not limited in this embodiment.

In addition, a photograph action involved in the embodiments of the disclosure may be an action of aiming a camera at a target after the camera is turned on, and correspondingly, the identity information is displayed in a real-time viewfinder screen. Alternatively, the photograph action may be an action of triggering a photograph control (such as a shutter button) after the camera is turned on, and correspondingly, the identity information and an image acquired by the camera are recorded in a photographed photo or a recorded video together.

The identity information presentation method provided in the embodiments of the disclosure is applicable to various offline interaction scenarios. A description is made below by using several specific offline interaction scenarios as examples.

1. An Offline Meeting Scenario

When the identity information presentation method is applicable to the offline meeting scenario, after a participant arrives at a meeting site, personal information (including a company, a name, and the like) that is presented outward (or to be shared with others) may be set through an application program that is installed in a terminal after authorization and an augmented reality contact card function of the application program may be enabled, and the application program reports the identity information and real-time geographical location information of the terminal to a server. When the participant needs to view identity information of other participants, the participant only needs to use the terminal to photograph a to-be-identified participant, and the application program identifies the participant in the image and determines a geographical location of the participant. Therefore, based on the geographical location, the identity information of the participant that is presented outward (or the personal information the to-be-identified participant has previously set through the application program) is obtained, and an augmented reality contact card that includes the identity information is displayed around the participant in the image.

Through the foregoing method, the participant may quickly know identities of other participants, so as to determine whether further communication is needed, which reduces communication costs for obtaining the identity information of other participants, reduces ineffective communication between the participants, and improves the communication efficiency between the participants.

2. An Offline Friend-Making Scenario

When the identity information presentation method is applicable to the offline friend-making scenario, after the user arrives at a friend-making site, friend-making information (including an age, a hobby, a goal of making friends, and the like) that is presented outward (or to be shared with others) may be set through an instant messaging application program that is installed in a terminal after authorization and an augmented reality contact card function of the instant messaging application program may be enabled, and the instant messaging application program reports the friend-making information and real-time geographical location information of the terminal to a server. When a user intends to view friend-making information of other users, the user only needs to use the terminal to photograph a to-be-identified user, and the application program identifies the user in the image and determine a geographical location of the user. Therefore, based on the geographical location, the friend-making information of the user that is presented outward (e.g., the friend-making information the to-be-identified user has previously set through the instant messaging application) is obtained, and an augmented reality contact card that includes the friend-making information is displayed around the user in the image. Through the displayed augmented reality contact card, the user may quickly know hobbies of other users, so as to quickly locate users with a same hobby and make friends with the users based on a similarity of the hobby, or quickly determine a communication topic based on the hobby to improve the friend-making efficiency between the users.

In some example embodiments, the users may also quickly establish a social relationship in the instant messaging application program based on the displayed augmented reality contact card, so as to make friends online.

3. An Offline Recruitment Scenario

When the identity information presentation method is applicable to the offline recruitment scenario, a recruiter may set company information through an application program in advance, and a candidate may set personal information through the application program in advance. When arriving at a recruiting site, both the recruiter and the candidate turn on an augmented reality contact function of the application program. When the candidate intends to know the company information of the recruiter, the candidate only needs to use a terminal to photograph the recruiter to obtain the company information of the recruiter, so as to determine whether further communication with the recruiter is needed in combination with the personal information. When the recruiter intends to know the personal information of the candidate, the recruiter only needs to use a terminal to photograph the candidate to obtain the personal information of the candidate, so as to determine whether further communication with the candidate is needed based on the personal information and a recruitment requirement, thereby improving the communication efficiency between the candidate and the recruiter.

Certainly, in addition to the foregoing several offline interaction scenarios, the solution provided in the embodiments of the disclosure may be further applicable to other offline interaction scenarios, and a specific application scenario is not limited in this embodiment.

Figure 2:
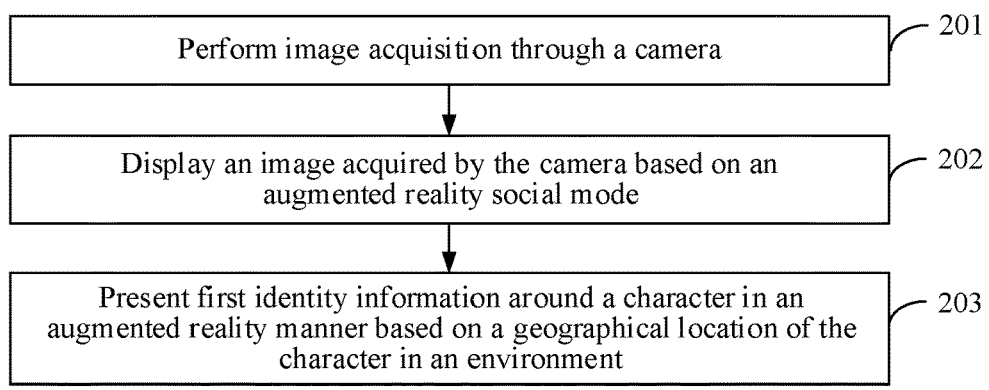
FIG. 2 is a flowchart of an identity information presentation method according to an exemplary embodiment of the disclosure.

FIG. 2 is a flowchart of an identity information presentation method according to an exemplary embodiment of the disclosure. This embodiment is illustrated by using an example in which the method is applicable to the first terminal 110 or the second terminal 130 shown in FIG. 1. The method includes the following steps 201-203.

Step 201. Perform image acquisition through a camera.

In an embodiment, an acquired image includes a character in an environment.

In an example embodiment, after an application program in a terminal enables an augmented reality card function, when an augmented reality contact card display instruction is received, the camera is turned on to perform image acquisition to acquire an image that includes a to-be-identified character.

The camera may be a camera to which a 3D vision technology is applicable, that is, based on the image acquired by the camera, information such as a spatial orientation and a size of each character in the image may be perceived. The 3D vision technology may be at least one of a time of flight (ToF) technology, a monocular stereo vision technology, a binocular vision technology, a multiple view stereo vision technology, or a 3D structured light technology, which is not limited in this embodiment.

Step 202. Display an image acquired by the camera based on an augmented reality social mode.

The augmented reality social mode is used for presenting augmented reality social information for a currently logged-in account.

In some embodiments, the displaying an image acquired by the camera includes at least one of the following methods: 1. display the image acquired by the camera in the augmented reality social mode on a terminal display screen; and 2. display the image acquired by the camera in the augmented reality social mode on augmented reality glasses, which is not limited in this embodiment.

Step 203. Present first identity information around a character in an augmented reality manner based on a geographical location of the character in an environment.

The first identity information is used for indicating a social identity of the character. In an embodiment, the character in the image is identified and first geographical location information corresponding to the character is determined, where the first geographical location information is used for representing the geographical location of the character in a real environment.

In the embodiments of the disclosure, the terminal obtains identity information corresponding to the to-be-identified character based on a geographical location of the to-be-identified character in a real environment. Therefore, when image acquisition is performed through the camera, the terminal identifies the character in the image, and determines the first geographical location information corresponding to the character. The first geographical location information is geographical location information in a world coordinate system. For example, the first geographical location information may be first latitude and longitude information corresponding to the character.

In an example embodiment, the terminal determines the first geographical location information corresponding to the character through the 3D vision technology and based on a geographical location thereof in the real environment. Therefore, the application program implementing an identity information presentation function needs to have an obtaining permission of geographical location information of the terminal.

In an embodiment, when multiple characters are identified in the image, the terminal determines the first geographical location information corresponding to each character; or the terminal determines a target character from the multiple characters, so as to determine the first geographical location information corresponding to the target character. The target character may be a character in the center of the image, or a character in a focus area, or a character specified by a user.

In an embodiment, the first identity information of the character is obtained based on the first geographical location information.

In an example embodiment, the terminal transmits an identity information obtaining request that includes the first geographical location information to a server. The server stores identity information reported by each terminal. After receiving the request, the server determines the terminal at a geographical location indicated by the first geographical location information, so as to determine identity information of the user corresponding to the terminal as the first identity information.

In an embodiment, since there is a certain error in the determined first geographical location information, the server determines a terminal that is closest to the geographical location indicated by the first geographical location information and a distance thereof is less than a distance threshold (for example, 1 m), so as to determine identity information of a user corresponding to the terminal as the first identity information.

The identity information stored in the server is identity information that is preset by the terminal and authorized to be presented outward, and the identity information may include at least one of text information, picture information, and video information. Information types of the identity information set by users through terminals may be the same or different. For example, identity information set by a user A through a terminal may include a name, a company, and a job, while identity information set by a user B through a terminal may include a name and a company.

Moreover, in different application scenarios, the information types of the identity information may also be different. For example, in an offline meeting scenario, the information types of the identity information may include a name, a company and a job; in an offline friend-making scenario, the information types of the identity information may include a name, an age, and a hobby; and in an offline recruitment scenario, the information types of the identity information may include a name, a graduated school, and a major.

In an embodiment, the first identity information is presented around the character in the augmented reality manner.

In an embodiment, after obtaining the first identity information, the terminal displays the first identity information around the character in the augmented reality manner. The terminal may render the first identity information in a specific augmented reality object element, so as to display the augmented reality object element around the character. For example, the terminal may render the first identity information in an augmented reality contact card, so as to display the augmented reality contact card around the character, so that the user may obtain the identity information thereof through the augmented reality contact card corresponding to the character.

In an embodiment, the first identity information is bound and displayed with the character, that is, the first identity information moves as the character moves in a screen, thereby ensuring a correspondence between the character and the first identity information. In addition, when the character moves out of the screen, presentation of the first identity information is stopped.

In conclusion, in the embodiments of the disclosure, when identity information of a specific character needs to be obtained during offline interaction, only a terminal needs to be used for performing image acquisition. The terminal may identify the character in an image, and determine a geographical location of the character in a real environment, so as to obtain the identity information of the character based on the geographical location and further display the identity information around the character in an augmented reality manner. According to the solution provided in the embodiments of the disclosure, a user does not need to determine an identity of a participant through face comparison, and in an offline interaction scenario where there are a large number of participants, the efficiency of obtaining identity information may be improved. In addition, obtaining identity information based on geographical location information may avoid a relatively large error of a face comparison result, thereby improving the accuracy of obtained identity information, and improving the efficiency of offline interaction.

In an example embodiment, the terminal uses an augmented reality contact card to display the obtained identity information, and in order to improve the efficiency of the user in locating a character with high communication value, the terminal determines a size of the augmented reality contact card based on a correlation degree between a to-be-identified user and the user, so that the user may quickly distinguish communication value of different characters based on the size of the augmented reality contact card. A schematic embodiment is provided below for description.

Figure 3:
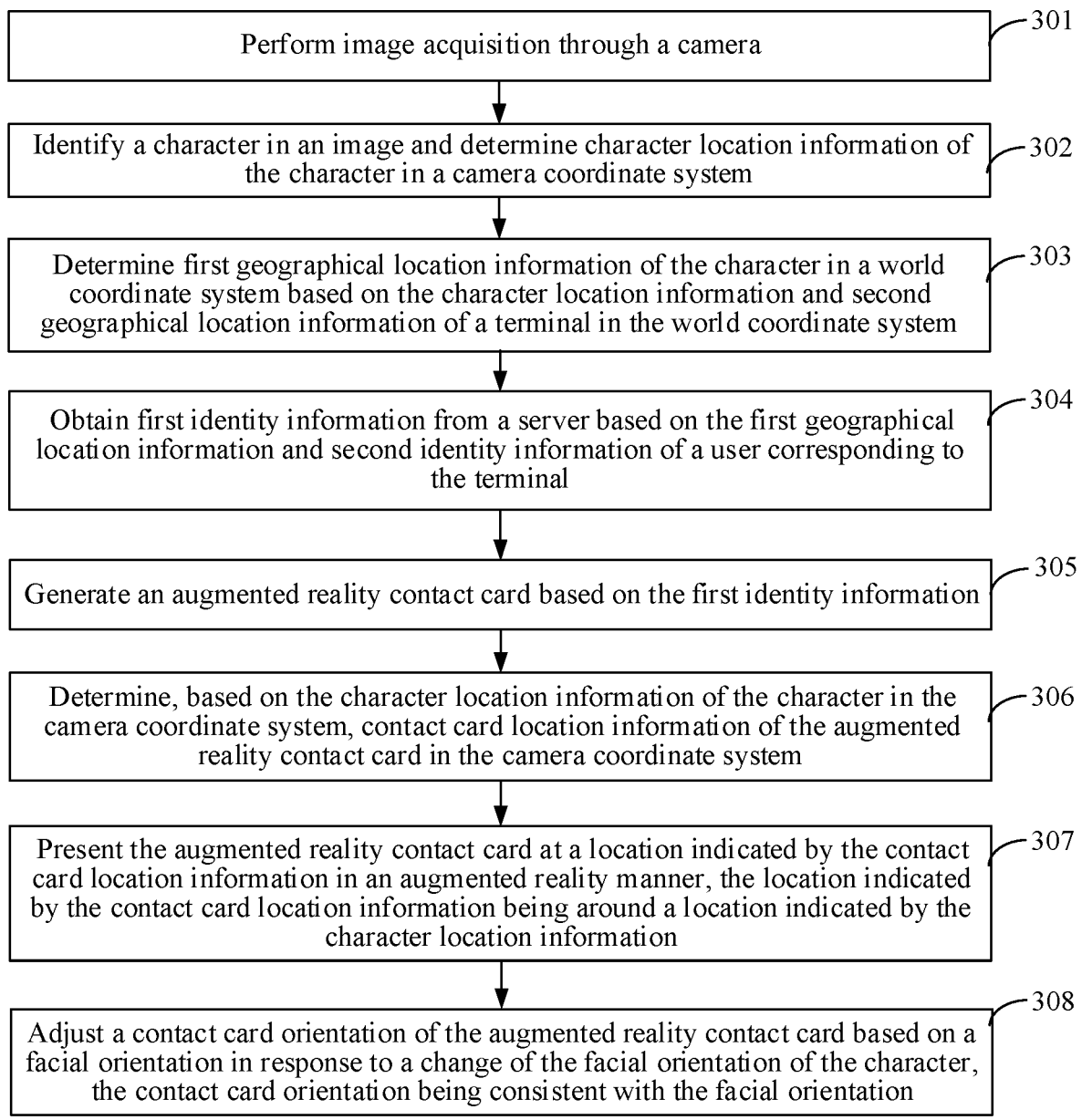
FIG. 3 is a flowchart of an identity information presentation method according to another exemplary embodiment of the disclosure.

FIG. 3 is a flowchart of an identity information presentation method according to another exemplary embodiment of the disclosure. This embodiment is illustrated by using an example in which the method is applicable to the first terminal 110 or the second terminal 130 shown in FIG. 1. The method includes the following steps, 301-308.

Step 301. Perform image acquisition through a camera.

Regarding this step, reference may be made to step 201, and details are not described again in this embodiment.

Step 302. Identify a character in an image and determine character location information of the character in a camera coordinate system.

In an example embodiment, a terminal has a capability of obtaining a geographical location thereof in a world coordinate system, and a capability of determining a location of the character in the image in the camera coordinate system. Therefore, the terminal may determine, based on a conversion relationship of geographical location information in different coordinate systems, geographical location information of the character in the image in the world coordinate system.

In an embodiment, after identifying the character in the image, the terminal determines the character location information of the character in the camera coordinate system through the 3D vision technology. The camera coordinate system is a three-dimensional rectangular coordinate system with a focus center of the camera as a coordinate origin and an optical axis as an axis Z.

In an example embodiment, when the terminal is provided with dual cameras, the terminal may determine the character location information of the character in the camera coordinate system through a binocular stereo vision technology (based on a principle of imaging difference between two eyes); and when the terminal is provided with a ToF camera, the terminal may determine the character location information of the character in the camera coordinate system through a ToF depth measurement technology. Certainly, the terminal may also determine the character location information in combination with various 3D visual technologies, so as to improve the accuracy of the character location information, which is not limited in this embodiment.

Figure 4:
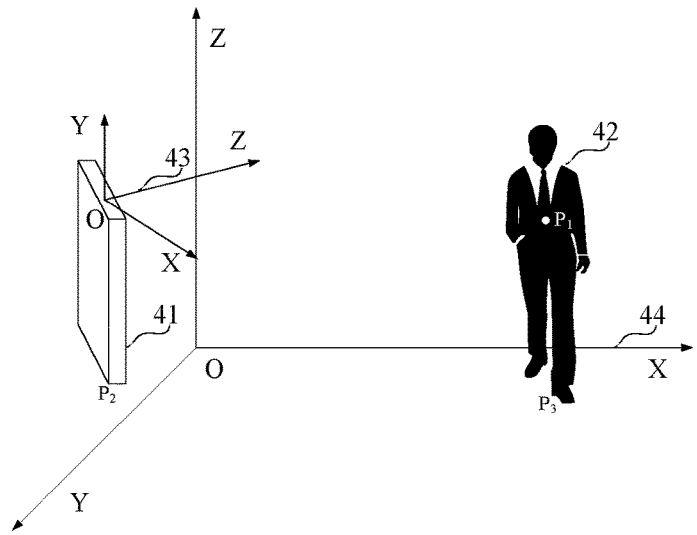
FIG. 4 is a schematic implementation diagram of a process of determining geographical location information of a character according to an exemplary embodiment of the disclosure.

FIG. 4 is a schematic implementation diagram of a process of determining geographical location information of a character according to an exemplary embodiment of the disclosure. In an embodiment, as shown in FIG. 4, a user uses a terminal 41 to photograph a character 42 to obtain character location information P1 of the character 42 in a camera coordinate system 43.

Step 303. Determine, based on the character location information and second geographical location information of a terminal in a world coordinate system, first geographical location information of the character in the world coordinate system.

In an example embodiment, after an augmented reality contact card function is enabled, the terminal obtains the second geographical location information thereof in the world coordinate system in real time, so as to convert the character location information from the camera coordinate system to the world coordinate system, and determine the first geographical location information of the character in the world coordinate system based on the second geographical location information and the converted first geographical location information.

The terminal may convert the character location information through a rotation matrix and a translation matrix, which is not limited in this embodiment.

Schematically, as shown in FIG. 4, the terminal 41 determines first geographical location information P3 of the character 42 in a world coordinate system 44 based on second geographical location information P2 thereof and the character location information P1 in the camera coordinate system.

This embodiment only takes the foregoing method as an example to illustrate a process of determining the first geographical location information. In other example embodiments, the terminal may also measure a distance and relative orientation to the character, or determine the first geographical location information of the character in the image in another possible manner, which is not limited in this embodiment.

Step 304. Obtain first identity information from a server based on the first geographical location information and second identity information of a user corresponding to the terminal, the second identity information meeting a view permission of the first identity information.

In an example embodiment, after an augmented reality contact card function is enabled, identity information of each user that has enabled the augmented reality contact card function is obtained through photographing.

However, in some application scenarios, the user needs to configure an obtaining permission for the identity information thereof. Therefore, in another example embodiment, the user may set a view permission for the identity information thereof, so as to present the identity information only to a user with the view permission. In an embodiment, the identity information set by the user and the view permission are uploaded to the server by the terminal, and then stored by the server. A specific setting process of the view permission is described in detail in the following embodiments.

Correspondingly, when the terminal obtains the first identity information of the character in the image from the server, in addition to the first geographical location information of the character, the terminal also needs to provide the second identity information of the user corresponding to the terminal, so that the server determines whether a current terminal has the view permission of the first identity information based on the second identity information. The second identity information corresponds to an account logged on to the terminal.

In an example embodiment, the terminal transmits an identity information obtaining request that includes the first geographical location information and the second identity information to the server, so that the server views matched first identity information based on the first geographical location information, and determines whether the terminal has the view permission of the first identity information based on the second identity information. Certainly, the terminal may only transmit the first geographical location information and a user identifier of the user corresponding to the terminal to the server, and the server obtains the second identity information based on the user identifier, which is not limited in this embodiment.

In an embodiment, the view permission includes an identity information condition, and the identity information condition may include an industry condition, a company condition, a job condition, a gender condition, an age condition, a hobby condition, an academic qualification condition, a work experience condition, and the like. This embodiment does not limit specific content of the view permission.

When the second identity information meets the view permission of the first identity information, the server feeds back the first identity information to the terminal; otherwise, the server does not feed back the first identity information to the terminal.

Step 305. Generate an augmented reality contact card based on the first identity information.

After obtaining the first identity information, the terminal renders and generates the augmented reality contact card according to the first identity information, where the augmented reality contact card may be generated on a basis of a preset contact card template based on the identity information.

In an example embodiment, sizes and forms of augmented reality contact cards generated based on different identity information are consistent. In another example embodiment, in order to improve the efficiency of the user in locating a user with high communication value, at least one of the sizes and forms of the augmented reality contact cards generated based on different identity information are different. In an embodiment, when the terminal generates the augmented reality contact card, the following steps may be included.

1. Obtain a character correlation degree, the character correlation degree being determined and obtained based on the first identity information and the second identity information of the user corresponding to the terminal.

In an example embodiment, after obtaining the first identity information based on the first geographical location information, the server obtains the second identity information of the user corresponding to the terminal, and determines the character correlation degree based on the first identity information and the second identity information, and feeds back the character correlation degree and the first identity information to the terminal. The higher the character correlation degree is, the higher the communication value of the character to a current user of the terminal is, and the lower the character correlation degree is, the lower the communication value of the character to the current user of the terminal.

In an embodiment, when the method is applicable to an offline meeting scenario, the server may calculate the character correlation degree through a preset acquaintance algorithm; when the method is applicable to an offline friend-making scenario, the server may calculate the character correlation degree through an interest matching algorithm; and when the method is applicable to an offline recruitment scenario, the server may calculate the character correlation degree through a resume matching algorithm, which is not limited in this embodiment.

Certainly, a step of determining the character correlation degree may also be performed by the terminal, thereby reducing the processing pressure of the server, which is not limited in this embodiment.

For two users, the character correlation degrees respectively corresponding to the two users may be the same or different. For example, a character correlation degree of a user A to a user B is s1, and a character correlation degree of the user B to the user A is s2, which is not limited in this embodiment.

2. Determine a contact card size based on the character correlation degree, the contact card size being positively correlated with the character correlation degree.

In an example embodiment, the augmented reality contact card has a default contact card size, and the terminal determines the contact card size of the augmented reality contact card corresponding to the first identity information according to the character correlation degree and the default contact card size. That is, the higher the character correlation degree is, the larger the contact card size of the augmented reality contact card is, and the lower the character correlation degree is, the smaller the contact card size of the augmented reality contact card is.

For example, when the character correlation degree corresponding to the first identity information is s ($0<s\leq1$), and the default contact card size is a*b, the determined contact card size is $(s \times a)*(s \times b)$.

3. Generate the augmented reality contact card based on the first identity information and the contact card size.

In an example embodiment, the terminal renders and generates the augmented reality contact card based on the first identity information and the contact card size, or the terminal renders and generates a default augmented reality contact card based on the first identity information and the default contact card size, and scales the default augmented reality contact card based on the character correlation degree to obtain the augmented reality contact card.

Figure 5:
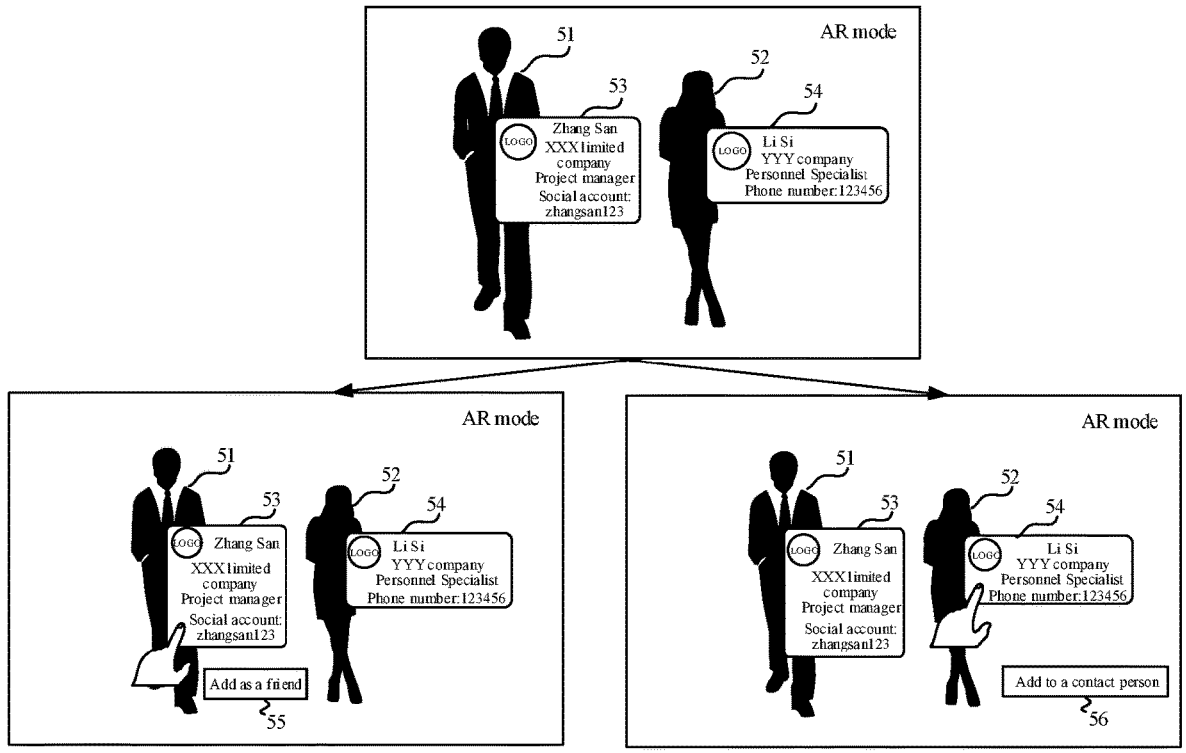
FIG. 5 is a schematic diagram of an interface of an augmented reality contact card display effect according to an exemplary embodiment of the disclosure.

FIG. 5 is a schematic diagram of an interface of an augmented reality contact card display effect according to an exemplary embodiment of the disclosure. Schematically, as shown in FIG. 5, the image photographed by the terminal includes a first character 51 and a second character 52. Since a character correlation degree of the first character 51 is 0.9, and a character correlation degree of the second character 52 is 0.5. Therefore, a contact card size of a first augmented reality contact card 53 corresponding to the first character 51 is larger than a contact card size of a second augmented reality contact card 54 corresponding to the second character 52.

The foregoing embodiment is only described by taking different character correlation degrees corresponding to different contact card sizes as an example. In other example embodiments, different contact card forms (such as colors, special effects) may be set for different character correlation degrees to identify a communication value level, which is not limited in this embodiment.

Step 306. Determine, based on the character location information of the character in the camera coordinate system, contact card location information of the augmented reality contact card in the camera coordinate system.

In order to simulate an effect of displaying a physical contact card around the character in a real world, when displaying the augmented reality contact card, the terminal needs to determine a contact card display location of the augmented reality contact card in the camera coordinate system. In an example embodiment, the terminal determines a target location from a predetermined range around a location indicated by the character location information based on the character location information of the character in the camera coordinate system, so as to determine the target location as the contact card location.

In an embodiment, the contact card location indicated by the contact card location information is at a preset distance from a region of the character, e.g., a preset distance below a character face (for example, 20 cm below the character face), or at a preset distance above a character head (for example, 10 cm above the character head). A specific contact card location is limited in this embodiment.

Step 307. Present the augmented reality contact card at a location indicated by the contact card location information in an augmented reality manner, the location indicated by the contact card location information being around a location indicated by the character location information.

In an embodiment, the terminal renders and displays the augmented reality contact card at the location indicated by the contact card location information in the augmented reality manner, and simulates an effect of displaying the physical contact card around the character in the real world.

Schematically, as shown in FIG. 5, the terminal displays the first augmented reality contact card 53 and the second augmented reality contact card 54 at 20 cm below the character face of the first character 51 and the second character 52 respectively.

The contact card location of the augmented reality contact card changes along with the character location, so as to achieve an effect that the contact card moves along with the character.

Step 308. Adjust a contact card orientation of the augmented reality contact card based on a facial orientation in response to a change of the facial orientation of the character, the contact card orientation being consistent with the facial orientation.

In an example embodiment, the contact card orientation of the augmented reality contact card (a side including the identity information) is consistent with the facial orientation of the character. Correspondingly, when the facial orientation of the character changes, the terminal adjusts the contact card orientation of the augmented reality contact card in real time based on the facial orientation, to improve the display authenticity of augmented reality contact card.

In an embodiment, the augmented reality contact card includes a contact card front and a contact card back. When the character turns the back to the user, the terminal displays the contact card back of the augmented reality contact card, and content displayed on the contact card back may be set by the user. For example, the contact card back may be a company logo.

In this embodiment, the terminal determines the geographical location information of the character in the world coordinate system based on the character location information of the character in the image in the camera coordinate system and the geographical location information of the terminal in the world coordinate system, which improves the accuracy of the determined geographical location information, thereby further improving the accuracy of subsequently obtained identity information.

In addition, in this embodiment, the terminal determines the character correlation degree based on correlation between identity information, and then determines a display size of the augmented reality contact card based on the character correlation degree, so that an augmented reality contact card size corresponding to a character with high communication value is larger than an augmented reality contact card size corresponding to a character with low communication value, and the efficiency of the user in selecting a communication character based on the augmented reality contact card is improved.

In an example embodiment, in order to improve the efficiency of establishing a social relationship between users, after the augmented reality contact card is displayed in the augmented reality manner, when a trigger operation on the augmented reality contact card is received, and the first identity information includes social information, the terminal displays a social relationship establishment control; and when a trigger operation on the social relationship establishment control is received, the terminal transmits a social relationship establishment request to a social server based on the social information to request to establish a social relationship. The terminal may determine whether the trigger operation on the augmented reality contact card is received based on pixel coordinates of the augmented reality contact card in the image.

In an embodiment, when the first identity information includes social information corresponding to at least two social applications, the terminal displays social relationship establishment controls respectively corresponding to different social applications, and when a trigger operation on a social relationship establishment control corresponding to a target social application is received, the terminal transmits a social relationship establishment request to the social server through the target social application based on the social information corresponding to the target social application.

When an application program to which the solution provided in the embodiments of the disclosure is applicable and the target social application are the same, the application program directly transmits the request to the social server based on the social information. However, when the application program to which the solution provided in the embodiments of the disclosure is applicable and the target social application are different application programs, the application program transmits a social relationship establishment request including the social information to the target social application by calling an application programming interface (API) provided by the target social application, and the target social application transmits the social relationship establishment request to the social server based on the social information.

Illustratively, as shown in FIG. 5, when a long-press operation on the first augmented reality contact card 53 is received, since the first augmented reality contact card 53 includes a social account, the terminal displays a social relationship establishment control 55, and the user clicks the social relationship establishment control 55 to quickly establish a social relationship.

In other example embodiments, when a trigger operation on the augmented reality contact card is received and the first identity information includes contact details information, the terminal displays a contact adding control; and when a trigger operation on the contact adding control is received, the terminal automatically creates a contact person based on the contact details information.

Illustratively, as shown in FIG. 5, when a long-press operation on the second augmented reality contact card 54 is received, since the second augmented reality contact card 54 includes a phone number, the terminal displays a contact person adding control 56, and the user may trigger the terminal to automatically add a contact person to an address book by clicking the contact adding control 56.

The foregoing embodiment describes a display process of the identity information, and the following describes a setting process of the identity information by using an illustrative embodiment.

Figure 6:
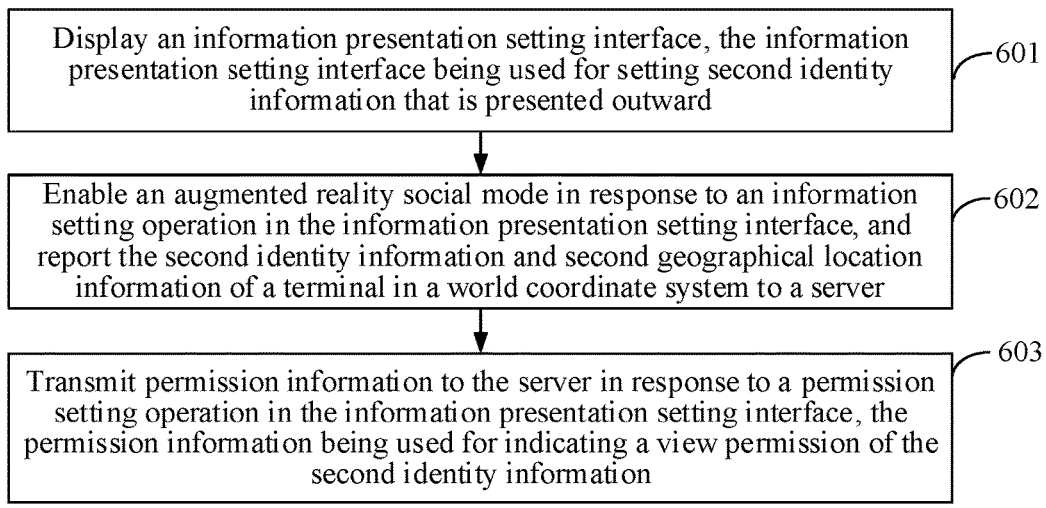
FIG. 6 is a flowchart of an identity information presentation method according to another exemplary embodiment of the disclosure.

FIG. 6 is a flowchart of an identity information setting process according to an exemplary embodiment of the disclosure. This embodiment is illustrated by using an example in which the method is applicable to the first terminal 110 or the second terminal 130 shown in FIG. 1. The method includes the following steps, 601-603.

Step 601. Display an information presentation setting interface, the information presentation setting interface being used for setting second identity information that is presented outward.

The information presentation setting interface may be manually triggered and displayed by a user, or may be automatically triggered and displayed by a terminal.

In an example embodiment, when an augmented reality social mode enabling instruction is received (triggered through a function entry in an application program), the terminal displays the information presentation setting interface, or, when an augmented reality social mode activation condition is currently met is detected, the terminal displays prompt information, and displays the information presentation setting interface when a trigger operation on the prompt information is received.

In an embodiment, when a route is provided in the terminal, the terminal obtains route information (including a route site and a route time) of a target route (an offline activity route), and detects whether a current geographical location and a current time are in the target route, If the current geographical location and the current time indicate being in the target route, the terminal displays an information presentation reminder to remind the user to enable an augmented reality social mode. The terminal displays the information presentation setting interface in response to a trigger operation on the information presentation reminder.

In some embodiments, the information presentation setting interface is a blank setting interface, and the user may customize an identity information item that is presented outward according to an identity presentation requirement. In some other embodiments, in order to improve the efficiency of the user in setting identity information, the information presentation setting interface includes preset identity information, and the user may quickly select identity information that is presented outward this time through the information presentation setting interface.

Figure 7:
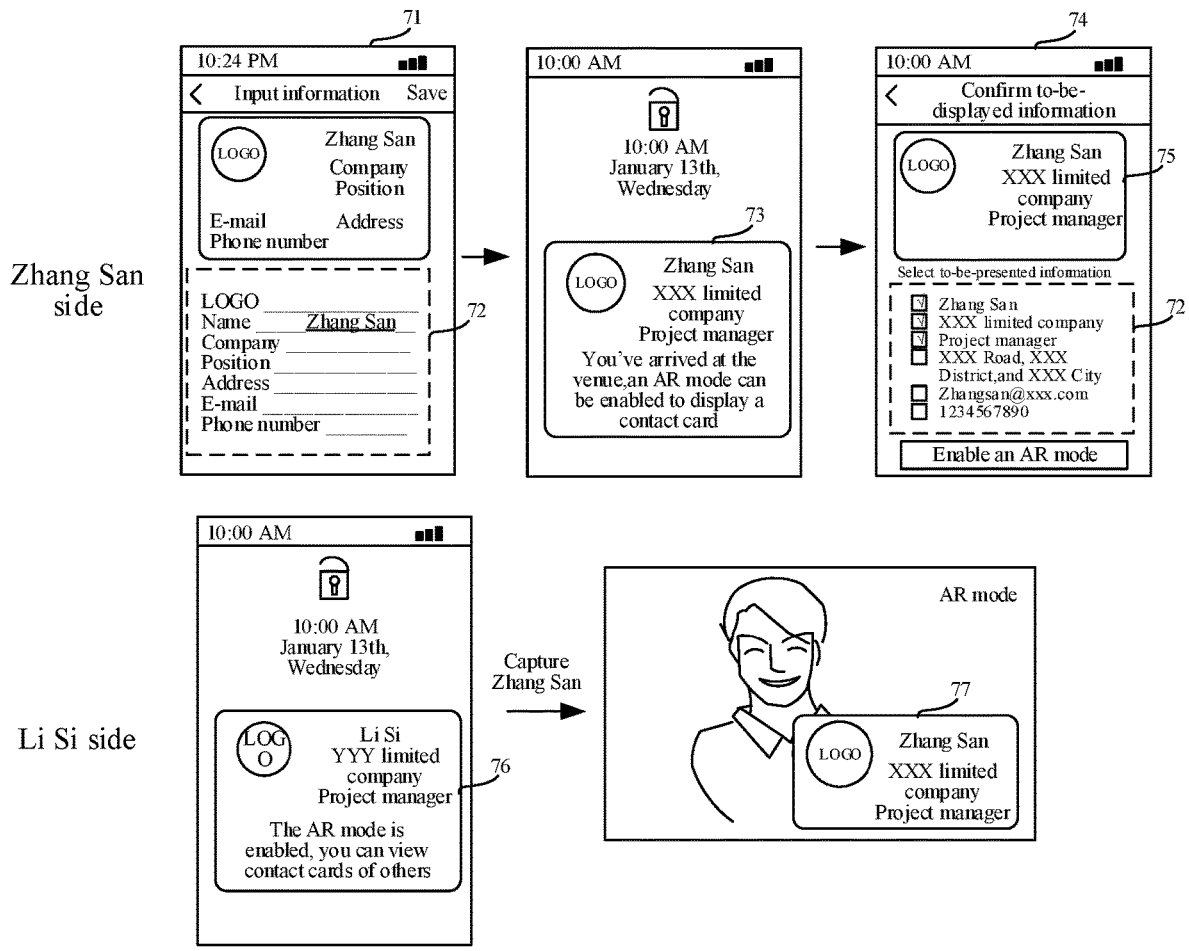
FIG. 7 is a schematic diagram of an interface of an identity information presentation process according to an exemplary embodiment of the disclosure.

FIG. 7 is a schematic diagram of an interface of an identity information presentation process according to an exemplary embodiment of the disclosure. Illustratively, as shown in FIG. 7, the user inputs identity information 72 in an identity information input interface 71 in advance and saves the identity information 72. When the user arrives at the route site indicated by the target route, the terminal displays an information presentation reminder notification 73 to remind the user to set the identity information that is presented outward and enable the augmented reality social mode. When a click operation on the information presentation reminder notification 73 is received, the terminal displays an information presentation setting interface 74, and the information presentation setting interface 74 includes the identity information 72 that is input in advance in the identity information input interface 71.

Step 602. Enable an augmented reality social mode in response to an information setting operation in the information presentation setting interface, and report the second identity information and the second geographical location information of the terminal in a world coordinate system to a server.

The information setting operation may be an upload operation, an input operation, or a check operation. In an embodiment, the information setting operation may further include a typesetting operation, and the typesetting operation is used for adjusting a display location of the second identity information on the augmented reality contact card.

Illustratively, as shown in FIG. 7, the user may check the preset identity information 72 in the information presentation setting interface 74 as the second identity information that is presented outward this time. In addition, the second identity information checked by the user will be displayed in an augmented reality contact card preview area 75, so that the user adjusts the display location of each piece of the second identity information in the augmented reality contact card preview area 75.

After completing setting of the second identity information, the terminal enables the augmented reality social mode, and uploads the second identity information and the second geographical location information thereof to the server, and the server stores the identity information and the geographical location information in association.

Since the geographical location of the terminal changes, during a process of enabling the augmented reality social mode, the terminal reports the second geographical location information to the server in real time, which improves the presentation accuracy of subsequent identity information.

Step 603. Transmit permission information to the server in response to a permission setting operation in the information presentation setting interface, the permission information being used for indicating a view permission of the second identity information.

In addition to setting the identity information, the information presentation setting interface may also set the view permission of the identity information, that is, the identity information set by the user may only be viewed by a terminal (user) with the view permission of the identity information.

In an embodiment, the terminal determines permission information corresponding to the second identity information based on the received permission setting operation, the permission information being used for indicating a condition that needs to be met by the user with the view permission, or used for indicating a condition that needs to be met to block a user.

In an embodiment, the terminal reports the determined permission information to the server, and the server stores the permission information and the identity information in association.

Figure 8:
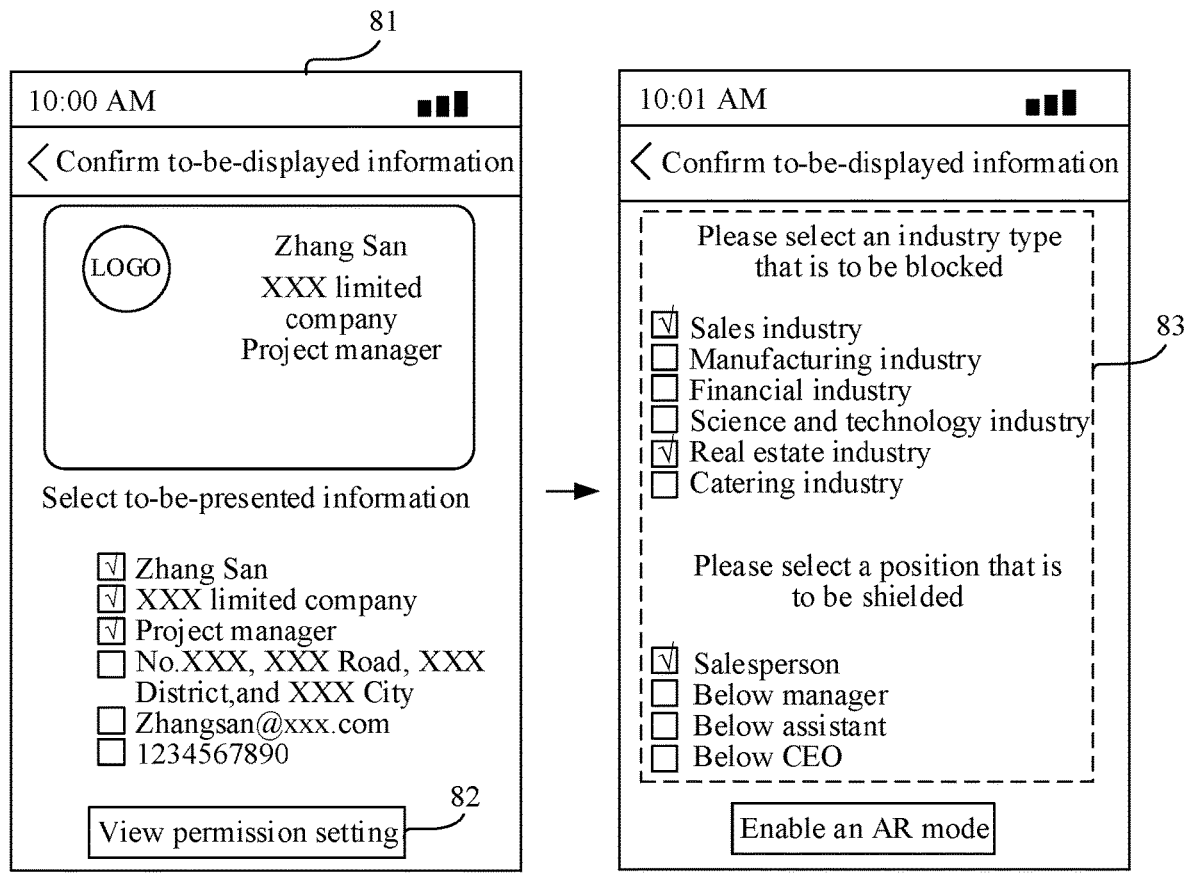
FIG. 8 is a schematic diagram of an interface of a view permission setting process according to an exemplary embodiment of the disclosure.

FIG. 8 is a schematic diagram of an interface of a view permission setting process according to an exemplary embodiment of the disclosure. Illustratively, as shown in FIG. 8, after checking the second identity information in the information presentation setting interface 81, the user may click the permission setting control 82 to perform view permission setting. After a click operation on the permission setting control 82 is received, the terminal displays a block option 83, and the user may select an industry and a job that need to be blocked from the block option 83, that is, a user belonging to the blocked industry or the blocked job cannot view the second identity information.

In an example embodiment, after completing the identity information setting, the terminal displays a contact card viewing prompt to prompt the user that contact cards of other users may be obtained through photographing. Illustratively, as shown in FIG. 7, after a user "Li Si" completes identity information setting, the terminal displays a contact card view prompt 76, and when a click operation on the contact card view prompt 76 is received, the terminal performs image acquisition, and displays an augmented reality contact card 77 of a user "Zhang San" in the image, where the augmented reality contact card 77 includes second identity information set by the user "Zhang San" through the information presentation setting interface 74.

In other example embodiments, users with the view permission may be divided, and different view content may be set for users with different view permission levels. For example, all identity information is set to be visible for users with first-level view permission, and only a part of the identity information (such as a name and a company) is set to be visible for users with second-level view permission, which is not limited in this embodiment.

In this embodiment, the terminal determines whether the user is in the target route based on the current geographical location and the current time, and when the user is in the target route, the terminal automatically prompts the user to perform identity information setting and enable the augmented reality social mode, so as to avoid a problem that the augmented reality contact card cannot be displayed normally because the user forgets to enable the augmented reality social mode.

In addition, while the identity information is set, view permission is set for the identity information, thereby improving the pertinence of the identity information presentation, and avoiding personal information leakage caused by randomly obtained identity information.

Figure 9:
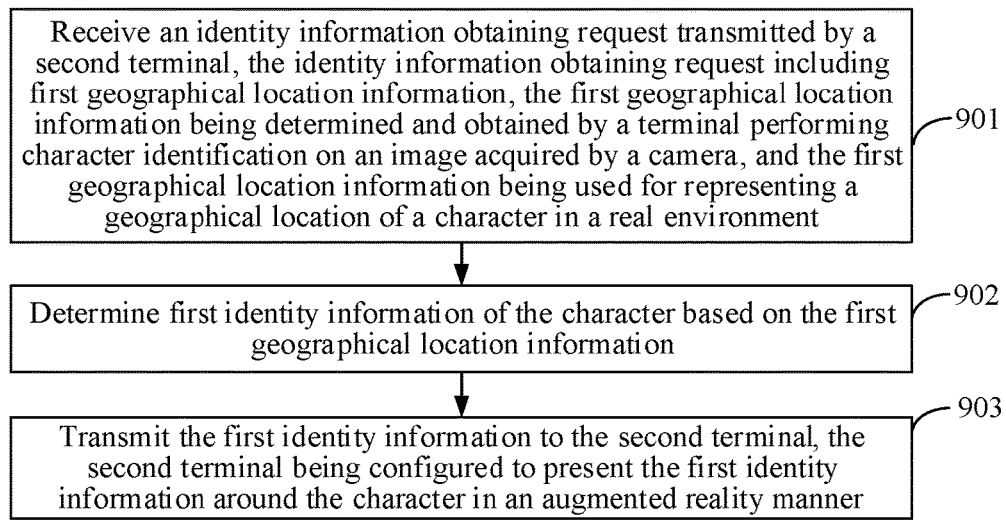
FIG. 9 is a flowchart of an identity information presentation method according to another exemplary embodiment of the disclosure.

FIG. 9 is a flowchart of an identity information presentation method according to another exemplary embodiment of the disclosure. This embodiment is illustrated by using an example in which the method is applicable to the server shown in FIG. 1. The method includes the following steps, 901-903.

Step 901. Receive an identity information obtaining request transmitted by a second terminal, the identity information obtaining request including first geographical location information, the first geographical location information being determined and obtained by a terminal performing character identification on an image acquired by a camera, and the first geographical location information is used for representing a geographical location of a character in a real environment.

In an example embodiment, after enabling an augmented reality social mode, the second terminal performs image acquisition through the camera, identifies the character in the image, and determines the first geographical location information of the character in a world coordinate system, so as to transmit the identity information obtaining request that includes the first geographical location information to the server to obtain first identity information of the character.

In an embodiment, after receiving the identity information obtaining request transmitted by the second terminal, the server detects whether the second terminal has enabled the augmented reality social mode. If the second terminal has not enabled the augmented reality social mode, the server prompts the terminal to enable the augmented reality social mode; and if the second terminal has enabled the augmented reality social mode, a subsequent process is executed. The server may determine whether the second terminal has enabled the augmented reality social mode by detecting whether identity information and geographical location information corresponding to the second terminal are stored.

Step 902. Determine first identity information of the character based on the first geographical location information.

In the embodiments of the disclosure, the server stores geographical location information and identity information corresponding to each terminal (with the augmented reality social mode enabled). After receiving the identity information obtaining request, the server calculates a distance between the first geographical location information and a location indicated by each stored geographical location information, thereby determining a character at a location indicated by the first geographical location information based on the distance, and further obtaining the first identity information corresponding to the character.

Illustratively, the server determines a character whose distance to the location indicated by the first geographical location information is smaller than a distance threshold and whose distance is the closest as a target character, so as to obtain the first identity information corresponding to the target character.

In order to improve a processing speed of the server, the server may perform regional division on the stored geographical location information, so as to determine a target region based on the first geographical location information, and then determine the target character from the target region, which is not limited in this embodiment.

In an embodiment, when determining the first identity information, the server may also detect, based on the first geographical location information and second geographical location information of the second terminal, whether a user corresponding to the second terminal is in a same scenario as the character in the image, and determine the first identity information of the character when the user corresponding to the second terminal and the character are in the same scenario.

Step 903. Transmit the first identity information to the second terminal, the second terminal being configured to present the first identity information around the character in an augmented reality manner.

The server feeds back the determined first identity information to the terminal, so that the second terminal displays the first identity information in the augmented reality manner. For a manner in which the second terminal displays the first identity information, reference may be made to the foregoing embodiments, and details are described herein again in this embodiment.

In conclusion, in the embodiments of the disclosure, when identity information of a specific character needs to be obtained during offline interaction, only a terminal needs to be used for performing image acquisition. The terminal may identify the character in an image and determine a geographical location of the character in a real environment, so as to obtain the identity information of the character based on the geographical location and further display the identity information around the character in an augmented reality manner. According to the solution provided in the embodiments of the disclosure, a user does not need to determine an identity of a participant through face comparison, and in an offline interaction scenario where there are a large number of participants, the efficiency of obtaining identity information may be improved. In addition, obtaining identity information based on geographical location information may avoid a relatively large error of a face comparison result, thereby improving the accuracy of obtained identity information, and improving the efficiency of offline interaction.

Figure 10:
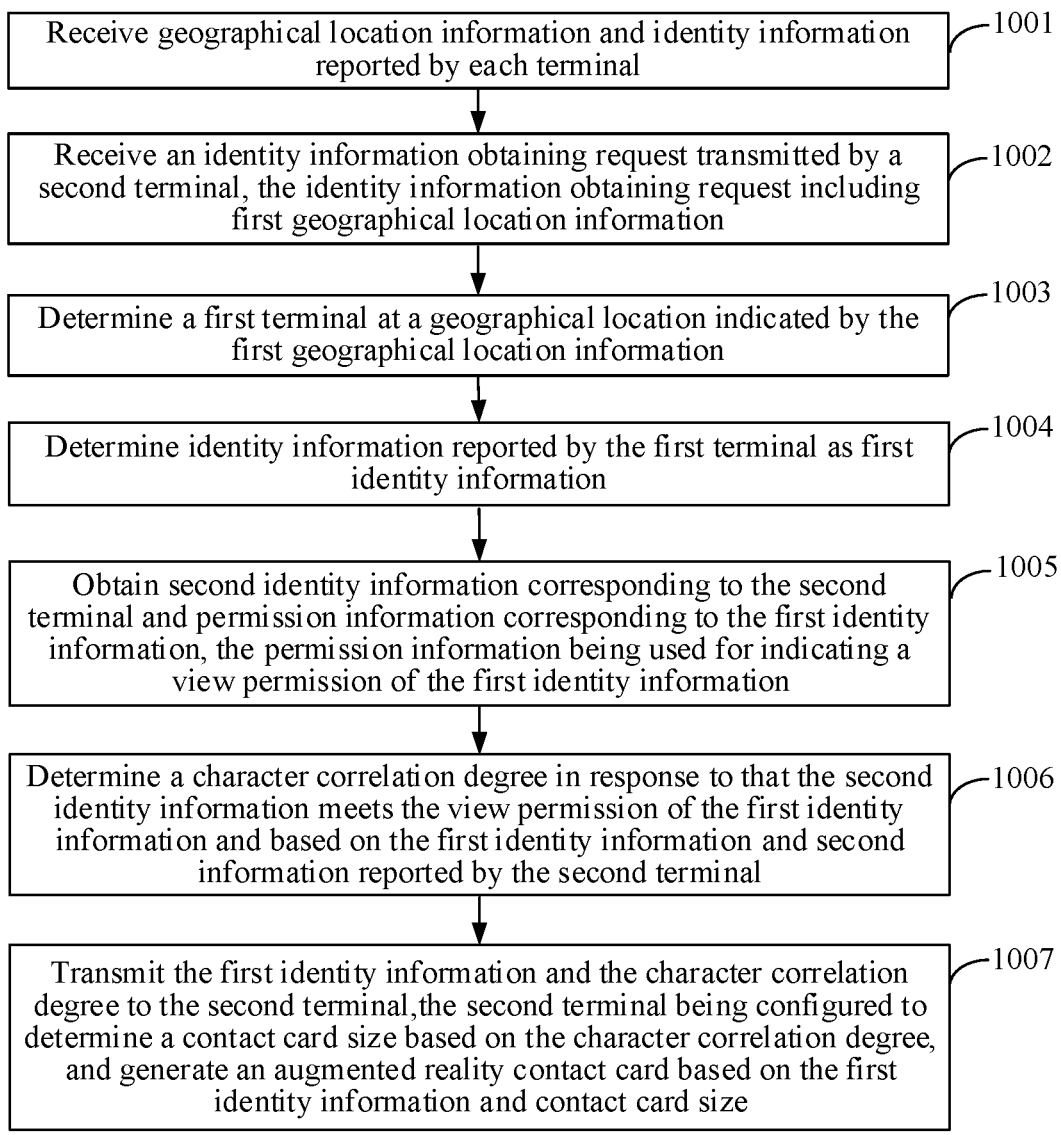
FIG. 10 is a flowchart of an identity information presentation method according to another exemplary embodiment of the disclosure.

FIG. 10 is a flowchart of an identity information presentation method according to another exemplary embodiment of the disclosure. This embodiment is illustrated by using an example in which the method is applicable to the server shown in FIG. 1. The method includes the following steps 1001-1007.

Step 1001. Receive geographical location information and identity information reported by each terminal.

In an example embodiment, after enabling an augmented reality social mode, the terminal reports identity information that is presented outward to the server, and reports real-time geographical location information to the server after the augmented reality social mode is enabled. After receiving information reported by the terminal, the server stores and updates the information. Illustratively, a correspondence between the geographical location information and the identity information stored in the server is shown in Table 1.

TABLE 1

| User ID | Geographical location information | Identity information |
|---|---|---|
| Zhang San | $P_1$ | Name: Zhang San; company: xxx limited company; job: project manager |
| Zhao Liu | $P_2$ | Name: Zhao Liu; company: zzz limited company; job: project manager |
| Li Si | $P_3$ | Name: Li Si; company: YYY limited company; job: project manager |
| Wang Wu | $P_4$ | Name: Wang Wu; company: JJJ limited company; job: project manager |

Step 1002. Receive an identity information obtaining request transmitted by a second terminal, the identity information obtaining request including first geographical location information.

Regarding this step, reference may be made to step 901, and details are not described again in this embodiment.

Step 1003. Determine a first terminal at a geographical location indicated by the first geographical location information.

In an example embodiment, the server determines a distance between a to-be-identified character and each terminal based on the first geographical location information and stored geographical location information of each terminal, so as to determine a terminal that is closest to the to-be-identified character as a first terminal.

Step 1004. Determine identity information reported by the first terminal as first identity information.

In an embodiment, based on the correspondence between the geographical location information and the identity information, the server obtains the first identity information according to the identity information obtaining request, where the included first geographical location information is P0. The server calculates that a distance between P0 and P1 is 20 meters, a distance between P0 and P2 is 100 meters, a distance between P0 and P3 is 0.5 meters, and a distance between P0 and P4 is 50 meters. The server determines that the to-be-identified character is "Li Si", and then obtains the first identity information corresponding to "Li Si": name: Li Si; company: YYY limited company; job: project manager Step 1005. Obtain second identity information corresponding to the second terminal and permission information corresponding to the first identity information, the permission information being used for indicating a view permission of the first identity information.

In an example embodiment, after obtaining the first identity information, the server detects whether the first identity information is set with the view permission. If the view permission is set, the server determines whether the second terminal has a permission to obtain the first identity information, and if the view permission is not set, the server directly executes a subsequent process.

In an embodiment, while transmitting the identity information to the server, the terminal transmits the set permission information to the server, and correspondingly, the server stores the permission information and the identity information in association. Illustratively, a correspondence among the geographical location information, the identity information, and the permission information is shown in Table 2.

TABLE 2

| User ID | Geographical location information | Identity information | Permission information |
|---|---|---|---|
| Zhang San | P₁ | Name: Zhang San; company: xxx limited company; job: project manager | Except for sales industry and real estate industry |
| Zhao Liu | P₂ | Name: Zhao Liu; company: zzz limited company; job: project manager | None |
| Li Si | P₃ | Name: Li Si; company: YYY limited company; job: project manager | Except for financial industry |

TABLE 2-continued

| User ID | Geographical location information | Identity information | Permission information |
|---|---|---|---|
| Wang Wu | P₄ | Name: Wang Wu; company: JJJ limited company; job: project manager | Manager and higher jobs |

The server detects whether the second identity information corresponding to the second terminal meets the view permission indicated by the permission information, if so, the following step 1006 is executed, and if not, the first identity information is not fed back to the second terminal.

Step 1006. Determine a character correlation degree in response to that the second identity information meets the view permission of the first identity information and based on the first identity information and the second information reported by the second terminal.

For the second terminal with the view permission, in order to improve the efficiency of the user in locating a character with high communication value based on a displayed augmented reality contact card, the server determines the character correlation degree between a user of the first terminal and a user of the second terminal based on the first identity information and the second identity information corresponding to the second terminal.

In an embodiment, when the method is applicable to an offline meeting scenario, the server may calculate the character correlation degree through an acquaintance algorithm; when the method is applicable to an offline friend-making scenario, the server may calculate the character correlation degree through an interest matching algorithm; and when the method is applicable to an offline recruitment scenario, the server may calculate the character correlation degree through a resume matching algorithm, which is not limited in this embodiment.

Step 1007. Transmit the first identity information and the character correlation degree to the second terminal, the second terminal being configured to determine a contact card size based on the character correlation degree, and generate an augmented reality contact card based on the first identity information and the contact card size.

In order to enable the second terminal to highlight the augmented reality contact card corresponding to the character with high communication value, the server transmits the determined character correlation degree to the second terminal while transmitting the first identity information to the second terminal. After receiving the information fed back by the server, the second terminal determines the contact card size of the augmented reality contact card according to the character correlation degree, and then displays the augmented reality contact card adopting the contact card size around the character. For a specific manner of displaying the augmented reality contact card, reference may be made to the foregoing embodiments, and details are not described in this embodiment again.

In this embodiment, the character correlation degree is determined based on correlation between identity information, and then a display size of the augmented reality contact card is determined based on the character correlation degree, so that an augmented reality contact card size corresponding to a character with high communication value is larger than an augmented reality contact card size corresponding to a character with low communication value, and the efficiency of the user in selecting a communication character based on the augmented reality contact card is improved.

In addition, while the identity information is set, view permission is set for the identity information, thereby improving the pertinence of the identity information presentation, and avoiding personal information leakage caused by randomly obtained identity information.

Figure 11:
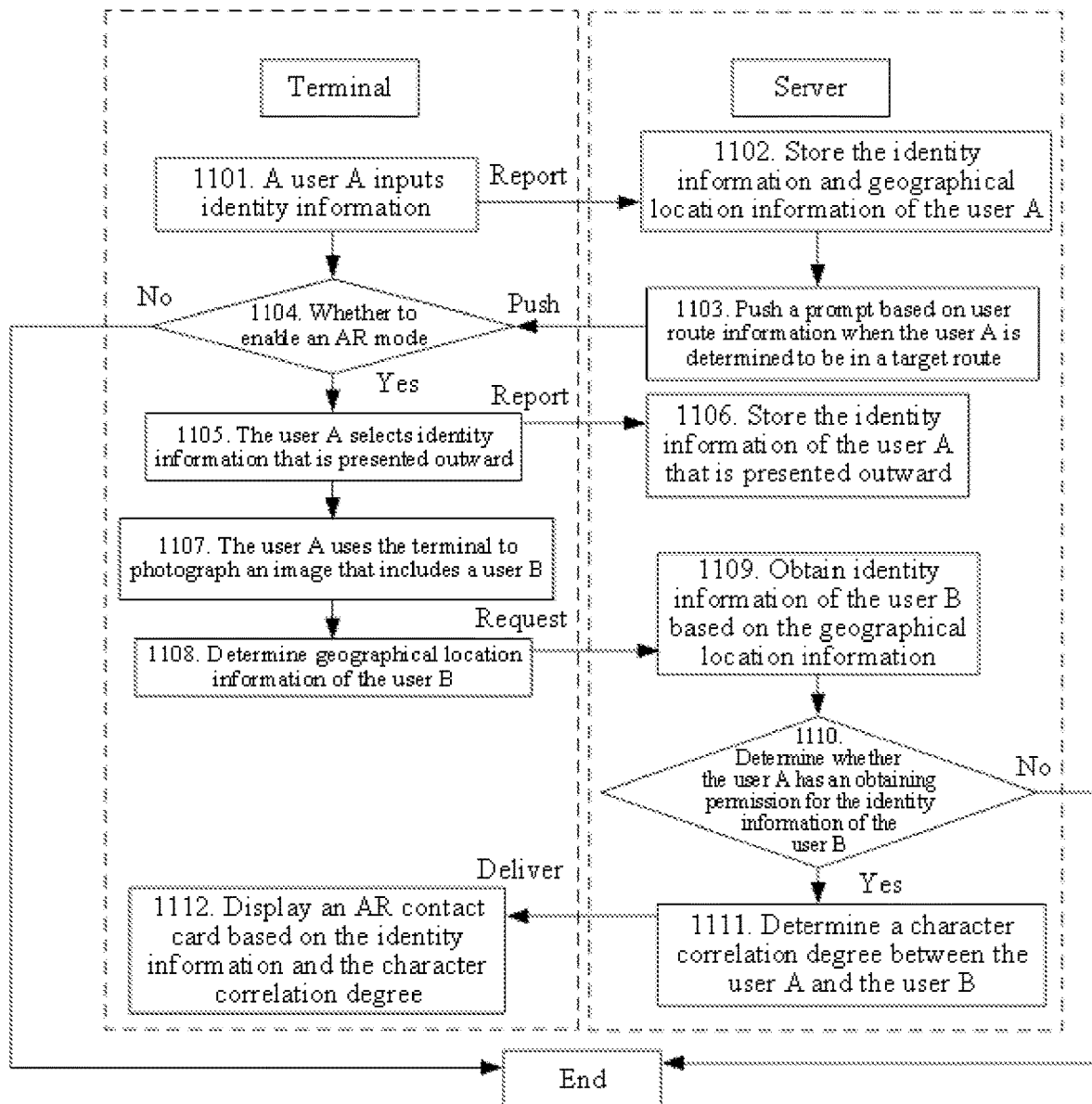
FIG. 11 is a flowchart of an interaction process between a terminal and a server according to an exemplary embodiment of the disclosure.

FIG. 11 is a flowchart of an interaction process between a terminal and a server according to an exemplary embodiment of the disclosure. In a schematic example, in an identity information presentation process, an interaction process between a terminal and a server includes steps 1101-1112 is shown in FIG. 11.

Step 1101. The terminal obtains identity information input by a user A, and reports the identity information to the server.

While reporting the identity information of the user A, the terminal reports geographical location information.

Step 1102. The server stores the identity information of the user A and the geographical location information.

Step 1103. The server determines that the user A is in a target route, and pushes a prompt based on user route information.

Step 1104. The terminal detects whether an augmented reality mode is enabled.

The augmented reality mode, or an augmented reality social mode, is used for indicating a mode in which the identity information is presented in an augmented reality manner.

Step 1105. The terminal determines the identity information that is presented outward and selected by the user A, and reports the identity information to the server.

Step 1106. The server stores the identity information of the user A that is presented outward.

Step 1107. The terminal obtains an image including a user B photographed by the user A through a camera.

The image includes the user B in an environment.

Step 1108. The terminal determines geographical location information of the user B and transmits a request to the server.

Step 1109. The server obtains identity information of the user B based on the geographical location information.

Step 1110. The server determines whether the user A has an obtaining permission of the identity information of the user B.

Step 1111. The server determines a character correlation degree between the user A and the user B.

Step 1112. The terminal displays an augmented reality contact card based on the identity information and the character correlation degree.

Figure 12:
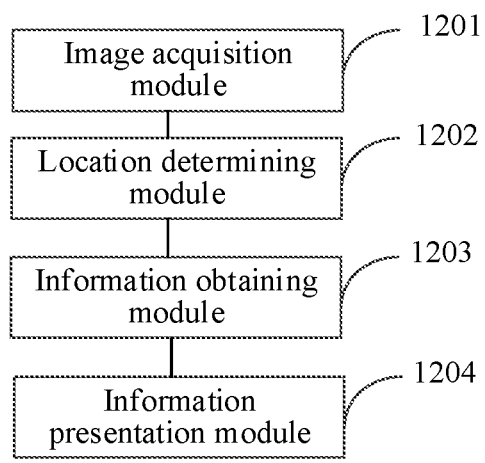
FIG. 12 is a structural block diagram of an identity information presentation apparatus according to an exemplary embodiment of the disclosure.

FIG. 12 is a structural block diagram of an identity information presentation apparatus according to an exemplary embodiment of the disclosure. As shown in FIG. 12, the apparatus includes:

an image acquisition module 1202, configured to perform image acquisition through a camera, an acquired image includes a character in an environment; and an information presentation module 1204, configured to display the image acquired by the camera based on an augmented reality social mode, the augmented reality social mode being used for presenting augmented reality social information for a currently logged-in account; and present first identity information around the character in an augmented reality manner based on a geographical location of the character in the environment, the first identity information being used for indicating a social identity of the character.

In an optional embodiment, the apparatus further includes:

a location determining module 1202, configured to identify the character in the image and determine first geographical location information corresponding to the character, the first geographical location information being used for representing the geographical location of the character in the environment;

an information obtaining module 1203, configured to obtain the first identity information of the character based on the first geographical location information; and the information presentation module 1204, configured to present the first identity information around the character in the augmented reality manner.

In an embodiment, the information presentation module 1204 includes a contact card generation unit, configured to generate an augmented reality contact card based on the first identity information;

a contact card location determining unit, configured to determine, based on character location information of the character in a camera coordinate system, contact card location information of the augmented reality contact card in the camera coordinate system;
and a contact card presentation unit, configured to present the augmented reality contact card at a location indicated by the contact card location information in the augmented reality manner, the location indicated by the contact card location information being around a location indicated by the character location information.

In an embodiment, the contact card generation unit is configured to:

obtain a character correlation degree, the character correlation degree being determined and obtained based on the first identity information and second identity information of an account corresponding to a terminal;

determine a contact card size based on the character correlation degree, the contact card size being positively correlated with the character correlation degree; and generate the augmented reality contact card based on the first identity information and the contact card size.

In an embodiment, the apparatus further includes:

an orientation adjustment module, configured to adjust, in response to a change of a facial orientation of the character, a contact card orientation of the augmented reality contact card based on the facial orientation, the contact card orientation being consistent with the facial orientation.

In an embodiment, the apparatus further includes:

a setting interface display module, configured to display an information presentation setting interface, the information presentation setting interface being used for setting second identity information that is presented outward, and the second identity information being corresponding to an account logged on to the terminal, and a reporting module, configured to enable the augmented reality social mode in response to an information setting operation in the information presentation setting interface, and report the second identity information and second geographical location information of the terminal in a world coordinate system to a server.

In an embodiment, the information presentation setting interface is further configured to set a view permission; and the reporting module is further configured to:

transmit permission information to the server in response to a permission setting operation in the information presentation setting interface, the permission information being used for indicating a view permission of the second identity information.

In an embodiment, the setting interface display module includes:

a reminder presentation unit, configured to display an information presentation reminder in response to that a current geographical location and a current time indicate being in a target route; and a setting interface display unit, configured to display the information presentation setting interface in response to a trigger operation on the information presentation reminder.

In an embodiment, the first identity information is set with a view permission;

and the information obtaining module 1203 is configured to:

obtain the first identity information from the server based on the first geographical location information and the second identity information of the account corresponding to the terminal, where the second identity information meets the view permission of the first identity information.

In an embodiment, the location determining module 1202 is configured to:

identify the character in the image and determine the character location information of the character in the camera coordinate system;

determine, based on the character location information and second geographical location information of the terminal in a world coordinate system, the first geographical location information of the character in the world coordinate system.

Figure 13:
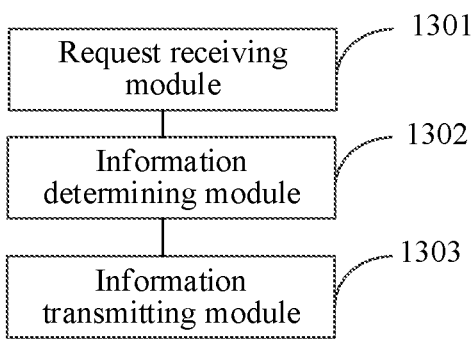
FIG. 13 is a structural block diagram of an identity information presentation apparatus according to another exemplary embodiment of the disclosure.

FIG. 13 is a structural block diagram of an identity information presentation apparatus according to an exemplary embodiment of the disclosure. As shown in FIG. 13, the apparatus includes;

a request receiving module 1301, configured to receive an identity information obtaining request transmitted by a second terminal, the identity information obtaining request including first geographical location information, the first geographical location information being determined and obtained by a terminal performing character identification on an image acquired by a camera, and the first geographical location information being used for representing a geographical location of a character in an environment.

an information determining module 1302, configured to determine first identity information of the character based on the first geographical location information, the first identity information being augmented reality social information corresponding to the character; and an information transmitting module 1303, configured to transmit the first identity information to the second terminal, the second terminal being configured to present the first identity information around the character in an augmented reality manner.

In an embodiment, the apparatus further includes:

a receiving module, configured to receive geographical location information and identity information reported by each terminal; and the information determining module 1302 includes:

a terminal determining unit, configured to determine a first terminal at a geographical location indicated by the first geographical location information; and an information determining unit, configured to determine the identity information reported by the first terminal as the first identity information.

In an embodiment, the apparatus further includes:

a correlation degree determining module, configured to determine a character correlation degree based on the first identity information and second identity information reported by the second terminal; and the information transmitting module 1303 is further configured to:

transmit the first identity information and the character correlation degree to the second terminal, the second terminal being configured to determine a contact card size based on the character correlation degree, and generate an augmented reality contact card based on the first identity information and the contact card size.

In an embodiment, the first identity information is set with a view permission; and the information transmitting module 1303 is further configured to:

obtain the second identity information corresponding to the second terminal and permission information corresponding to the first identity information, the permission information being used for indicating the view permission of the first identity information; and transmit the first identity information to the second terminal in response to that the second identity information meets the view permission of the first identity information.

The apparatus provided in the foregoing embodiment is only illustrated with an example of division of the foregoing functional modules. In an actual application, the foregoing functions may be allocated to and completed by different functional modules as required, that is, an internal structure of the apparatus is divided into different functional modules to implement all or some of the functions described above. In addition, the apparatus provided in the foregoing embodiment and the method embodiments belong to the same concept. For implementation details, reference may be made to the method embodiments, and details are not described herein again.

Figure 14:
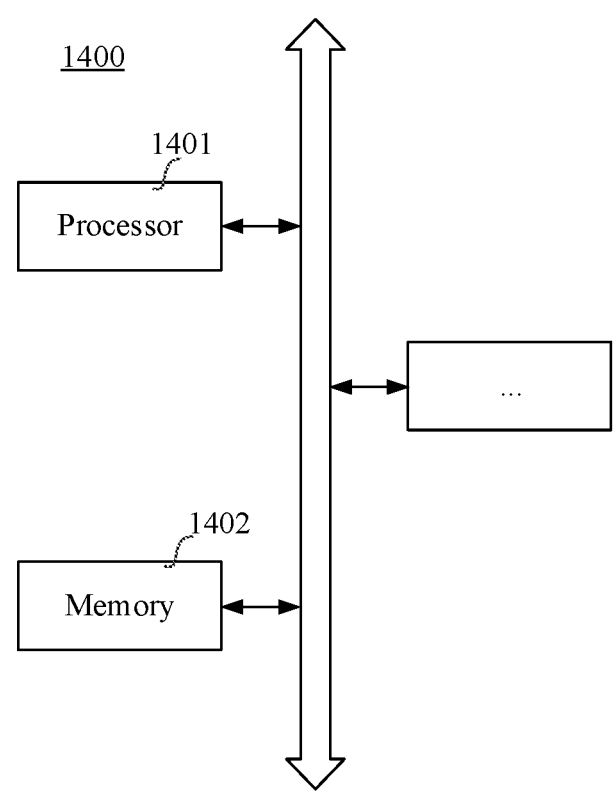
FIG. 14 is a structural block diagram of a terminal according to an exemplary embodiment of the disclosure.

FIG. 14 is a structural block diagram of a terminal 1400 according to an exemplary embodiment of the disclosure. The terminal 1400 may be a portable mobile terminal, for example, a smartphone, a tablet computer, a Moving Picture Experts Group Audio Layer III (MP3) player, or a Moving Picture Experts Group Audio Layer IV (MP4) player. The terminal 1400 may be further referred to as other names such as user equipment and a portable terminal.

Generally, the terminal 1400 includes: a processor 1401 and a memory 1402.

The processor 1401 may include one or more processing cores, and may be, for example, a 4-core processor or an 8-core processor. The processor 1401 may be implemented by using at least one hardware form of a digital signal processor (DSP), a field-programmable gate array (FPGA), and a programmable logic array (PLA). The processor 1401 may also include a main processor and a coprocessor. The main processor is a processor configured to process data in an awake state, and is also referred to as a central processing unit (CPU). The coprocessor is a low power consumption processor configured to process data in a standby state. In some embodiments, the processor 1401 may be integrated with a graphics processing unit (GPU). The GPU is configured to render and draw content that needs to be displayed on a display screen. In some embodiments, the processor 1401 may further include an artificial intelligence (AI) processor. The AI processor is configured to process computing operations related to machine learning.

The memory 1402 may include one or more computer-readable storage media. The computer-readable storage medium may be tangible and non-transitory. The memory 1402 may further include a high-speed random access memory and a non-volatile memory, for example, one or more disk storage devices or flash storage devices. In some embodiments, the non-transitory computer-readable storage medium in the memory 1402 is configured to store at least one instruction, and the at least one instruction is executed by the processor 1401 to implement the method provided in the embodiments of the disclosure.

In some embodiments, the terminal 1400 may also optionally include other components, a person skilled in the art may understand that the structure shown in FIG. 14 constitutes no limitation on the terminal 1400, and the terminal may include more or fewer components than those shown in the figure, or some components may be combined, or a different component deployment may be used.

Figure 15:
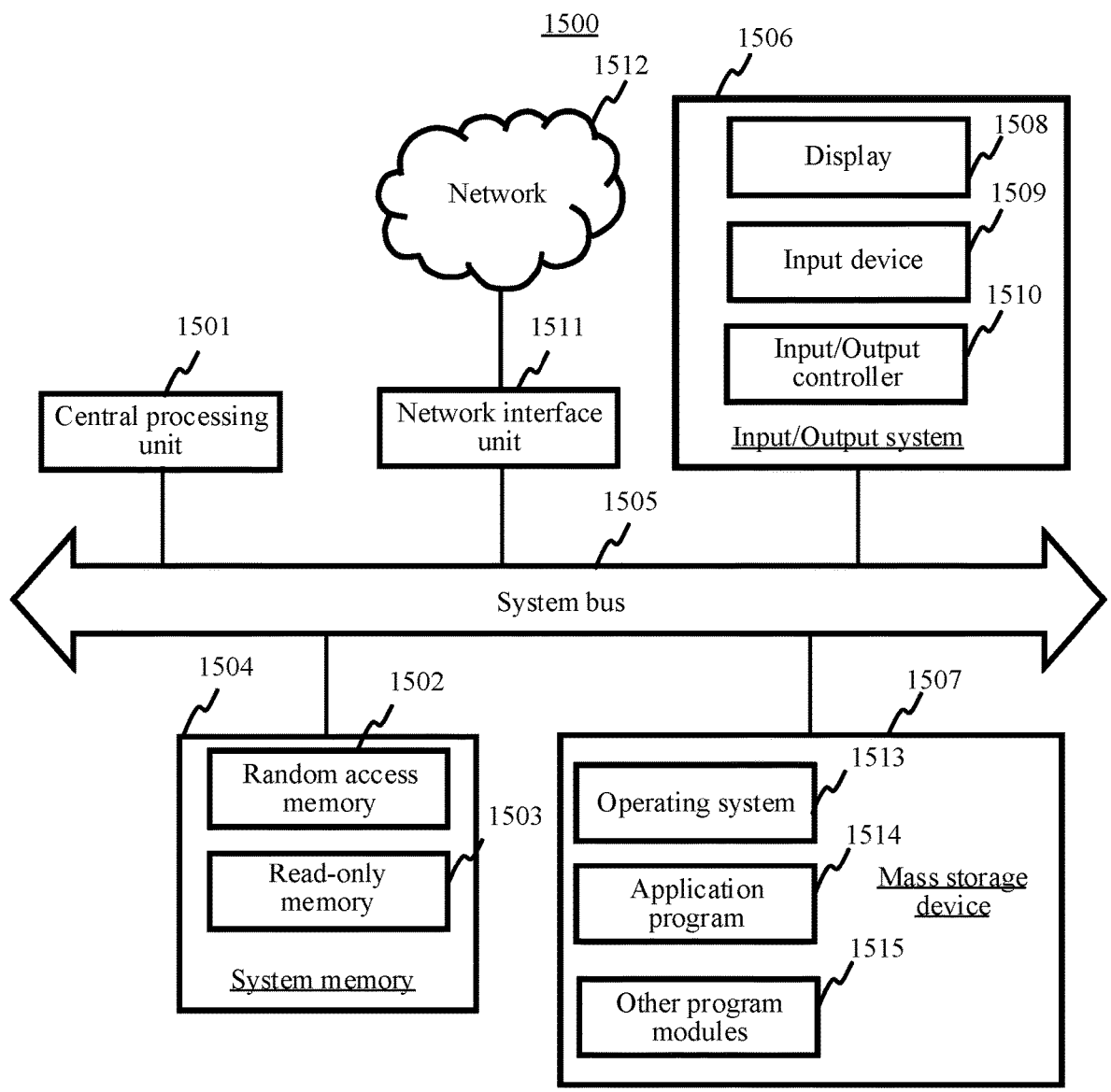
FIG. 15 is a schematic structural diagram of a server according to an exemplary embodiment of the disclosure.

FIG. 15 is a schematic structural diagram of a server according to an exemplary embodiment of the disclosure. Specifically, the server 1500 includes a CPU 1501, a system memory 1504 that includes a random access memory 1502 and a read-only memory 1503, and a system bus 1505 that connects the system memory 1504 and the CPU 1501. The server 1500 further includes a basic input/output system (I/O system) 1506 for transmitting information between components in a computer, and a mass storage device 1507 configured to store an operating system 1513, an application program 1514, and another program module 1515.

The basic I/O system 1506 includes a display 1508 configured to display information and an input device 1509 such as a mouse and a keyboard for a user to input information. The display 1508 and the input device 1509 are both connected to the CPU 1501 through an input/output controller 1510 connected to the system bus 1505. The basic I/O system 1506 may further include the input/output controller 1510 for receiving and processing inputs from a plurality of other devices such as the keyboard, the mouse, an electronic stylus, or the like. Similarly, the input/output controller 1510 further provides an output to the display screen, a printer, or other types of output devices.

The mass storage device 1507 is connected to the CPU 1501 through a mass storage controller (not shown) connected to the system bus 1505. The mass storage device 1507 and an associated computer-readable medium provide non-volatile storage for the server 1500. That is, the mass storage device 1507 may include a computer-readable medium (not shown), such as a hard disk or a drive.

In general, the computer-readable medium may include a computer storage medium and a communication medium. The computer storage medium includes volatile and non-volatile, removable and non-removable media that are configured to store information such as computer-readable instructions, data structures, program modules, or other data and that are implemented by using any method or technology. The computer storage medium includes a random access memory (RAM), a read-only memory (ROM), a flash memory or other solid state storage technologies, a compact disc read-only memory (CD-ROM), a digital versatile disc (DVD) or other optical storage, a tape cartridge, a magnetic tape, disk storage or other magnetic storage devices. Certainly, a person skilled in the art may learn that the computer storage medium is not limited to the above. The foregoing system memory 1504 and the mass storage device 1507 may be collectively referred to as a memory.

The memory stores one or more programs, and the one or more programs are configured to be executed by one or more CPUs 1501. The one or more programs include instructions used for implementing the foregoing method, and the CPU 1501 executes the one or more programs to implement the method on a server side in the foregoing method embodiments.

According to various embodiments of the disclosure, the server 1500 may further be connected, by using a network such as the Internet, to a remote computer on the network and run. That is, the server 1500 may be connected to a network 1512 by using a network interface unit 1511 connected to the system bus 1505, or may be connected to another type of network or a remote computer system (not shown) by using the network interface unit 1511.

The memory further includes one or more programs. The one or more programs are stored in the memory. The one or more programs include an instruction used for performing the steps, performed by the server, in the method provided in the embodiments of the disclosure.

An embodiment of the disclosure further provides a computer-readable storage medium, storing at least one piece of program code, the at least one piece of program code being loaded and executed by a processor, to implement the identity information presentation method according to the foregoing aspects.

An embodiment of the disclosure provides a computer program product or a computer program. The computer program product or the computer program includes computer instructions, and the computer instructions are stored in a computer-readable storage medium. A processor of a computer device reads the computer instructions from the computer-readable storage medium and executes the computer instructions to cause the computer device to perform the identity information presentation method provided in the foregoing embodiment.

A person of ordinary skill in the art may understand that all or some of the steps of the methods in the foregoing embodiments may be implemented by a program instructing relevant hardware. The program may be stored in a computer-readable storage medium. The computer-readable storage medium may be the computer-readable storage medium included in the memory in the foregoing embodiments, or may be a computer-readable storage medium that exists independently and that is not assembled in a terminal. The computer-readable storage medium stores at least one instruction, at least one program, a code set, or an instruction set, the at least one instruction, the at least one program, the code set, or the instruction set being loaded and executed by a processor to implement the method according to any one of the foregoing method embodiments.

In an embodiment, the computer-readable storage medium may include: a ROM, a RAM, a solid state drive (SSD), an optical disc, or the like. The RAM may include a resistive RAM (ReRAM) and a dynamic RAM (DRAM). The sequence numbers of the foregoing embodiments of the disclosure are merely for description purpose, and do not indicate the preference among the embodiments.

A person of ordinary skill in the art may understand that all or part of the steps of implementing the foregoing embodiments may be implemented by hardware, or may be implemented by a program instructing related hardware. The program may be stored in a computer-readable storage medium. The storage medium mentioned may be a RAM, a magnetic disk or an optical disc.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. An augmented reality based identity information presentation method, performed by a terminal including a camera, the method comprising:

acquiring an image by using the camera, the acquired-image comprising a character;

displaying the image acquired by the camera based on an augmented reality social mode, in which augmented reality social information is provided for a currently logged-in account;

presenting, based on a geographical location of the character, an augmented reality contact card based on first identity information at a location indicated by a contact card location information around the character in an augmented reality manner, the first identity information indicating a social identity of the character, the contact card location information of the augmented reality contact card in a camera coordinate system being based on character location information of the character in the camera coordinate system; and subsequent to presenting the augmented reality contact card, adjusting, in response to a change of a facial orientation of the character, a contact card orientation of the augmented reality contact card based on the facial orientation, the contact card orientation being consistent with the facial orientation.

2. The method according to claim 1, wherein the first identity information comprises:

identifying the character in the image and determining first geographical location information representing the geographical location of the character; and obtaining the first identity information of the character based on the first geographical location information.

3. The method according to claim 2, wherein the generating the augmented reality contact card comprises:

obtaining a character correlation degree, the character correlation degree being based on the first identity information and second identity information of an account corresponding to the terminal;

determining a contact card size based on the character correlation degree, the contact card size being positively correlated with the character correlation degree; and generating the augmented reality contact card based on the first identity information and the contact card size.

4. The method according to claim 2, wherein the first identity information is set with a view permission; and the obtaining the first identity information of the character based on the first geographical location information comprises:

obtaining the first identity information from a server based on the first geographical location information and second identity information of an account corresponding to the terminal, the second identity information meeting the view permission of the first identity information.

5. The method according to claim 2, wherein the identifying the character in the image and the determining the first geographical location information comprises:

identifying the character in the image and determining the character location information of the character in the camera coordinate system; and determining, based on the character location information and second geographical location information of the terminal in a world coordinate system, the first geographical location information of the character in the world coordinate system.

6. The method according to claim 1, wherein before the displaying the image acquired by the camera based on the augmented reality social mode, the method further comprises:

displaying an information presentation setting interface for setting second identity information corresponding to an account logged on to the terminal; and enabling the augmented reality social mode in response to an information setting operation in the information presentation setting interface, and reporting the second identity information and second geographical location information of the terminal in a world coordinate system to a server.

7. The method according to claim 6, wherein the method further comprises:

transmitting permission information to the server in response to a permission setting operation in the information presentation setting interface, the permission information indicating a view permission of the second identity information.

8. The method according to claim 6, wherein the displaying the information presentation setting interface comprises:

displaying an information presentation reminder in response to a current geographical location and a current time being in a target route; and displaying the information presentation setting interface in response to a trigger operation for the information presentation reminder.

9. An identity information presentation method, performed by a server, the method comprising:

receiving an identity information obtaining request from a terminal, the identity information obtaining request comprising first geographical location information-representing a geographical location of a character, which is captured by a camera of the terminal, the first geographical location information being based on an image of the character captured by the camera;

determining, based on the first geographical location information, first identity information of the character indicating a social identity of the character: and the first identity information being augmented reality social information corresponding to the character; and transmitting the first identity information to the terminal, to be presented as an augmented reality contact card at a location indicated by a contact card location information around the character in an augmented reality manner; and subsequent to transmitting the first identity information and the presenting the augmented reality contact card by e terminal, transmitting, in response to a change of a facial orientation of the character, adjusted contact card orientation of the augmented reality contact card based on the facial orientation, the adjusted contact card orientation being consistent with the change of the facial orientation of the character.

10. A server, comprising a processor and a memory, the memory storing at least one instruction, the at least one instruction being loaded and executed by the processor to implement the identity information presentation method according to claim 9.

11. An identity information presentation apparatus, included in a terminal, comprising:

at least one memory configured to store program code; and at least one processor configured to read the program code and operate as instructed by the program code, the program code including:

image acquisition code configured to cause the at least one processor to acquire an image by using a camera, the image comprising a character;

displaying code configured to cause the at least one processor to display the image acquired by the camera based on an augmented reality social mode, in which augmented reality social information is provided for a currently logged-in account;

first information presentation code configured to cause the at least one processor to present, based on a geographical location of the character, an augmented reality contact card based on first identity information at a location indicated by a contact card location information around the character in an augmented reality manner, the first identity information indicating a social identity of the character, the contact card location information of the augmented reality contact card in a camera coordinate system being based on character location information of the character in the camera coordinate system; and second information presentation code configured to cause the at least one processor to, subsequent to presenting the augmented reality contact card, adjust, in response to a change of a facial orientation of the character, a contact card orientation of the augmented reality contact card based on the facial orientation, the contact card orientation being consistent with the facial orientation.

12. The apparatus according to claim 11, wherein the program code further comprises:

location determining code configured to cause the at least one processor to identify the character in the image and determine first geographical location information representing the geographical location of the character; and information obtaining code configured to cause the at least one processor to obtain the first identity information of the character based on the first geographical location information.

13. The apparatus according to claim 11, wherein the contact card generation code is configured to cause the at least one processor to:

obtain a character correlation degree, the character correlation degree being based on the first identity information and second identity information of an account corresponding to the terminal;

determine a contact card size based on the character correlation degree, the contact card size being positively correlated with the character correlation degree; and generate the augmented reality contact card based on the first identity information and the contact card size.

14. The apparatus according to claim 11, wherein the program code further comprises:

interface display code configured to cause the at least one processor to display an information presentation setting interface for setting second identity information corresponding to an account logged on to the terminal, and reporting code configured to cause the at least one processor to enable the augmented reality social mode in response to an information setting operation in the information presentation setting interface, and report the second identity information and second geographical location information of the terminal in a world coordinate system to a server.

15. The apparatus according to claim 14, wherein the reporting code is further configured to cause the at least one processor to:

transmit permission information to the server in response to a permission setting operation in the information presentation setting interface, the permission information indicating a view permission of the second identity information.

16. The apparatus according to claim 14, wherein the interface display code comprises:

reminder presentation code configured to cause the at least one processor to display an information presentation reminder in response to a current geographical location and a current time being in a target route; and setting interface display code configured to cause the at least one processor to display the information presentation setting interface in response to a trigger operation for the information presentation reminder.

* * * * *